US007159208B2

(12) United States Patent
Keeley

(10) Patent No.: US 7,159,208 B2
(45) Date of Patent: Jan. 2, 2007

(54) PROGRAMMING TOOLKIT FOR USE IN THE DEVELOPMENT OF KNOWLEDGE ENHANCED ELECTRONIC LOGIC PROGRAMS

(76) Inventor: Thomas M. Keeley, 1040 Thornridge Ct., Brookfield, WI (US) 53012

( * ) Notice: Subject to any disclaimer, the term of this patent is extended or adjusted under 35 U.S.C. 154(b) by 635 days.

(21) Appl. No.: 10/289,477

(22) Filed: Nov. 6, 2002

(65) Prior Publication Data
US 2003/0083760 A1   May 1, 2003

Related U.S. Application Data

(63) Continuation-in-part of application No. 10/001,738, filed on Oct. 25, 2001, now Pat. No. 6,833,842.

(60) Provisional application No. 60/408,525, filed on Sep. 5, 2002, provisional application No. 60/344,146, filed on Dec. 27, 2001.

(51) Int. Cl.
G06F 9/44 (2006.01)
G06F 3/00 (2006.01)

(52) U.S. Cl. ..................................... 717/109; 715/800
(58) Field of Classification Search ................ 717/109; 715/800
See application file for complete search history.

(56) References Cited

U.S. PATENT DOCUMENTS

| | | | |
|---|---|---|---|
| 5,499,319 A | | 3/1996 | Al Janabi et al. |
| 5,631,974 A | * | 5/1997 | Lau-Kee et al. ............ 382/132 |
| 5,732,397 A | | 3/1998 | DeTore et al. |
| 5,751,915 A | | 5/1998 | Werbos |
| 5,818,975 A | * | 10/1998 | Goodwin et al. ........... 382/274 |
| 5,990,888 A | * | 11/1999 | Blades et al. ............... 715/764 |
| 5,999,923 A | | 12/1999 | Kowalski et al. |
| 6,018,346 A | | 1/2000 | Moran et al. |
| 6,067,719 A | | 5/2000 | Forman |
| 6,088,689 A | | 7/2000 | Kohn et al. |
| 6,098,062 A | | 8/2000 | Janssen |
| 6,195,643 B1 | | 2/2001 | Maxwell |
| 6,198,839 B1 | | 3/2001 | Kuan et al. |
| 6,394,263 B1 | | 5/2002 | McCrory |
| 6,684,385 B1 | * | 1/2004 | Bailey et al. ............... 717/109 |
| 6,704,012 B1 | * | 3/2004 | Lefave ....................... 345/440 |

OTHER PUBLICATIONS

Constantin von Altrock, "Fuzzy Logic and NeuroFuzzy Application Explained", Prentice Hall PTR 1995.

(Continued)

*Primary Examiner*—Tuan Dam
*Assistant Examiner*—John Romano
(74) *Attorney, Agent, or Firm*—Boyle Fredrickson Newholm Stein & Gratz S.C.

(57) ABSTRACT

A graphical programming interface for use in developing computer programs providing computational decision-making capabilities. The interface uses a structure of graphically displayed positions, arguments and linkages to enable the development of computational decision making programs. The positions are primarily characterized by position values that may represent outputs although they may have a variety of other function features such as thresholds. The arguments are characterized by argument values that may represent inputs. The arguments are associated with particular positions and the values of the arguments associated with a given position are combined to determine the value of that position. The linkages extend between different positions and arguments and define different types of functional relationships between them. Programs are developed through the creation and manipulation of the graphical items of the interface using visually oriented processes such as drop down windows and drag and drop techniques.

11 Claims, 33 Drawing Sheets

OTHER PUBLICATIONS

"How Does Fuzzy Logic work". Sep. 2002. from www.sptronix.com/fide/howfuzzy.htm.

Expert Choice 2000 Product Brief, from www.expertchoice.com/productbrief/.

* cited by examiner

PROGRAMMING TOOLKIT FOR USE IN THE DEVELOPMENT OF KNOWLEDGE ENHANCED ELECTRONIC LOGIC PROGRAMS

CROSS-REFERENCE TO RELATED APPLICATIONS

This patent application is based on provisional filings Ser. No. 60/408,525 entitled "Implementation of Knowledge Enhanced Electronic Logic" and filed Sep. 5, 2002, and Ser. No. 60/344,146 entitled "Implementation of Knowledge Enhanced Electronic Logic and filed Dec. 27, 2001, and claims the benefit thereof and is a continuation-in-part of patent application Ser. No. 10/001,738 entitled "Quantitative Decision Support Program filed Oct. 25, 2001 now U.S. Pat. No. 6,833,842.

BACKGROUND OF THE INVENTION

The present invention relates to computer programming and more particularly to computer programs that provide knowledge enhanced electronic logic or computational decision making and to programming tools for use in developing knowledge enhanced electronic logic or computational decision making programs which simulate human decision making.

Formal processes that describe human decision-making have been discussed for many years. As early as 1738 Daniel Bernouilli announced the concept of decision theory in an attempt to explain the non-linear value of money. Both knowledge capture and decision-making have long been addressed from the standpoint of academic research. Dr. Horst Rittel and Dr. Melvin Webber, in their paper titled "Dilemmas in a general Theory of Planning", identified the difference between "tame" problems (those where a formula can be used to calculate an answer) and "wicked" problems (where the answer lies in the gray area, somewhere between good and bad). They focused their work on city planning activities and created the "Issues Based Information System" (IBIS) process in order to decompose a problem by structuring the information in the form of a decision tree including decisions and arguments. Researchers working on the decision-making processes determined long ago that problems are best broken down or decomposed in order to solve them. Many decision-making methodologies focus on choosing the best option or alternative. These techniques usually emphasize decomposing the decision into criteria or attributes against which all alternatives should be compared. First, each criteria is rated as to its importance in the final decision and then each optional solution is compared against each of the criteria. These processes have been given several names in the academic literature such as Multi Attribute Decision Making (MADM), Multi-Attribute Value Theory (MAVT), Multi-Attribute Utility Theory (MAUT) and Multi-Criteria Decision Analysis (MCDA). A similar spin-off has been Analytical Hierarchy Process (AHA) decision making that has focused on making pair wise comparisons. These processes work well when comparing similar options where the same criteria are applicable. This type of decision is applicable to choosing a particular car or choosing between an apple and an orange but not when balancing choices where the criteria are inconsistent. Further, these processes have not been adapted for use in computational decision-making programs for embedded systems or for real time control.

Artificial Intelligence and Expert Systems have taken many forms since the topics were first conceived. Rule-based systems were commonly referred to as reverse chaining or forward chaining. Reverse chaining systems started with a solution and worked back through all the data to determine whether the solution was valid. This approach worked for simple decisions when some data might be missing. Forward chaining systems start with the data and try to determine the solution. Rule-based systems supplied the concepts of confidence factors or certainty factors as part of the math behind the results. These types of systems were commonly used to evaluate static problems where the rules are fixed and the impact of each rule is stable. In many real world decision-making situations rule based systems quickly become complex and hard to understand. Computer programs based on rule based systems are usually expensive to develop and difficult to debug. Further, they can be inflexible and if changes occur may require complete recoding of system solutions.

Fuzzy Logic was developed as a mechanism to circumvent the need for rigorous mathematical modeling. Fudge factors in control systems were replaced by self-explanatory linguistic descriptions that use soft terms that most humans can easily understand to describe a situation. Discrete data items are translated or fuzzified into different levels of participation in membership functions that describe the input domain in easily understood terms. The membership functions are characterized by simple geometric patterns which extend across different regions of the input domain. Likewise the output range is described by membership functions having geometric patterns which extend across different regions in the output range. Linguistic type if-then rules are then formulated to define the transfer of membership participation from the input membership functions to the output membership functions. The output is then defuzzified according to a combinational strategy such as center of gravity. Software packages exist which provide program development interfaces that enable the generation of typical input and output membership functions and the on-screen generation of transfer rules. Such software may also allow for multiple inputs and outputs which may be visually displayed as blocks on the left and right sides of a program development screen with blocks for the fuzzy logic rules shown in between. Some programs then allow fuzzy logic program code may be automatically generated based on the functions and rules defined on the program development screen. Fuzzy logic can be used for decision-making but is not well adapted to handling multiple inputs and outputs or for enabling complex interactions between the components of the system. Fuzzy logic rules may have the advantage of allowing simple descriptions but they are likewise limited in what they can provide. It is often difficult to explain the results of fuzzy logic decisions because the result is determined by geometric based participation in various membership domains.

Neural nets were developed to mimic the structure of the human brain and can provide a form of decision-making. Each neuron in a neural net processes incoming inputs and supplies outgoing outputs. The outputs are linked to other neurons which are frequently deployed in multiple interconnected layers across which signals are transferred from inputs on one side to outputs on the other side with some of the neurons providing interfaces to the outside world. Neural nets are "trained" to establish a pattern of desired behavior. Learning algorithms modify individual neurons by weighting or reinforcing certain of their connections with other neurons. Neural nets are fascinating to contemplate but require a lot of program code, are hard to properly train and are not well adapted for dealing with applications requiring sharp changes in output based on limited input variation.

BRIEF SUMMARY OF THE INVENTION

The present invention comprises a system for developing computer programs useful for computational decision-making including a graphical programming interface, an overall data structure and an execution engine. The system uses multiple hierarchical tree structures of positions (or decisions) and of arguments (or challenges) each of which is associated a particular position. Each position is primarily characterized by a modified value which usually corresponds to a final or intermediate output and includes other functional features such as position importance, a position threshold and a position clipper window. Each argument is characterized by an argument value and usually corresponds to an initial or intermediate input. The values of the arguments associated with a given position are combined to determine the modified value of that position. Arguments may be supporting arguments which raise the modified value of the position or objecting arguments which decrease the modified value of the position. A complete program usually includes a large number of positions and arguments. The system also uses sets of linkages which may be used to define functional relationships between the different positions and arguments. The linkages allow different positions and arguments to be conveniently connected and combined into complex functional structures.

The graphical programming interface provides graphical representations of the positions as position value bars within importance boxes and of the arguments as slider bars deployed in proximity to the positions. The importance boxes provide a visual indication of the level of importance and the value bars provide a visual indication of the modified values of the positions. The slider bars provide a visual indication of the argument values which may be coupled to outside inputs, connected to other positions or manually set by the developer. A set of connection points is associated with each position and a connection point is associated with each argument. Each position includes connection points associated with its modified value, importance, threshold, clipper window upper limit and clipper window lower limit. The connection points are used in forming linkages providing functions related to the points of connection. The importance of a position scales the overall modified value of the position. The threshold is graphically adjustable so it can be set at any level along the position assembly. The threshold generates a zero output or full output depending on whether the modified value is less than or equal to or more than the threshold set point. The clipper window upper and lower limits are graphically adjustable so they can be set at any level along the position assembly and generate outputs in accordance with the level of a position's modified value in relation to the clipper window.

A program may be generated by specifying positions and arguments associated with these positions through the use of drop down windows. Linkages are then formed by clicking on connection points and using the cursor to create linkages by dragging and dropping linkage lines between connection points. The linkages provide overall functionality in accordance with their points and order of connection. The interface allows a computational decision making program to be conveniently developed by a highly visual programming methodology. A program may also be formed out of parts by merging multiple program segments together.

The overall data structure comprises a position data table, an argument data table and as linkage data structure including data arrays associated with each type of linkage. The position data table stores basic position data such as modified value, importance, threshold set point, clipper set points and a position ID and is accessed in accordance with an index count value. The argument data table stores basic argument data such as argument value, type (supporting or objecting) and parent (a position ID) and is accessed in accordance with an index count value. The data arrays of the linkage data structures store basic data entries by linkage type specifying the linkage connections in accordance with an index count value. The data structure provides a convenient and compact memory structure for supporting the execution engine of the system.

The execution engine includes several basic routines and several code segments for arriving at stable modified values for the positions. The program first enters an overall Iterative Loop Routine in which it selects the first position in the position data table, passes to the Do Decisions Routine whereby all other routines and code segments are invoked with respect to that selected position and returns to check for changes in basic position and argument values. If changes occur, the loop is re-executed and all other routines and code segments are iteratively run and rerun until stable values are settled upon. The Do Decisions Routine includes the Accumulate Arguments Routine, the Make Decisions Routine and the Make Linkage Adjustments Routine. The Accumulate Arguments Routine separately collects the supporting and objecting arguments for the selected position. The Make Decisions Routine combines the arguments and evaluates the modified value of the selected position. Starting with an initial modified value of zero, supporting arguments increase the current modified value by sequentially adding the product of the current supporting argument and the difference between the position importance and current modified value to the current value of the modified value. Objecting arguments reduce modified value by sequentially reducing the current modified value by the product of the current modified value and the current objecting argument. The Make Linkage Adjustments Routine passes through all the code segments associated with linkages and modifies the position and argument values of all other positions and arguments in accordance with the linkages connecting to the selected position.

It is an object of the present invention to provide an easy to use system for rapidly developing highly efficient and effective computer programs for use in computational decision-making.

It is another object of the present invention to provide a graphical programming interface which enables computer programs for computational decision making to be developed in a highly visual and intuitive manner using graphical items, drop down windows and drag and drop techniques for defining functional relationships.

It is a further object of the present invention to provide tools for the development of computer programs having an architecture which reflects a hierarchical tree structure of positions or decisions and arguments or challenges and which simulates human decision making.

It is yet another object of the present invention to provide for the automatic generation of computer code for computational decision making based on graphically created structures representing functional elements and including positions, arguments and linkages.

It is a yet further object of the present to provide computer programs for computational decision making which are characterized by simple, compact and efficient data structures.

It is yet another object of the present invention to provide computer programs for computational decision making which are characterized by well organized, efficient and effective program code and program processes.

It is a yet further object of the present invention to provide for the development of computer programs which reflect a hierarchical structure of positions and supporting and objecting arguments in which the arguments associated with each position are mathematically combined to arrive at values for the positions using a simple but effective computer algorithms.

It is yet another object of the present invention to provide a toolkit for use in developing computer programs for computational decision making which warns the user of potentially unstable operations.

It is a yet further object of the present invention for the development of computer programs having an architecture which reflects a hierarchical tree structure of positions and arguments and includes a variety of different types of linkages which define different types of functional relationships between the positions and arguments.

It is yet another object of the present invention to provide for the development of computer programs having an architecture which reflects a structure of positions and arguments and which includes linkages enabling one position to drive the importance of another position or the value of an argument.

It is a yet further object of the present invention for the development of computer programs having an architecture which reflects a structure of positions and arguments and which includes linkages enabling threshold and clipper window functionality between different positions and arguments.

It is yet another object of the present invention to provide for the development of computer programs featuring Knowledge Enhanced Electronic Logic ("KEEL") which provides for effective computational decision making which simulates human decision making.

DETAILED DESCRIPTION OF THE INVENTION

Figure 1:
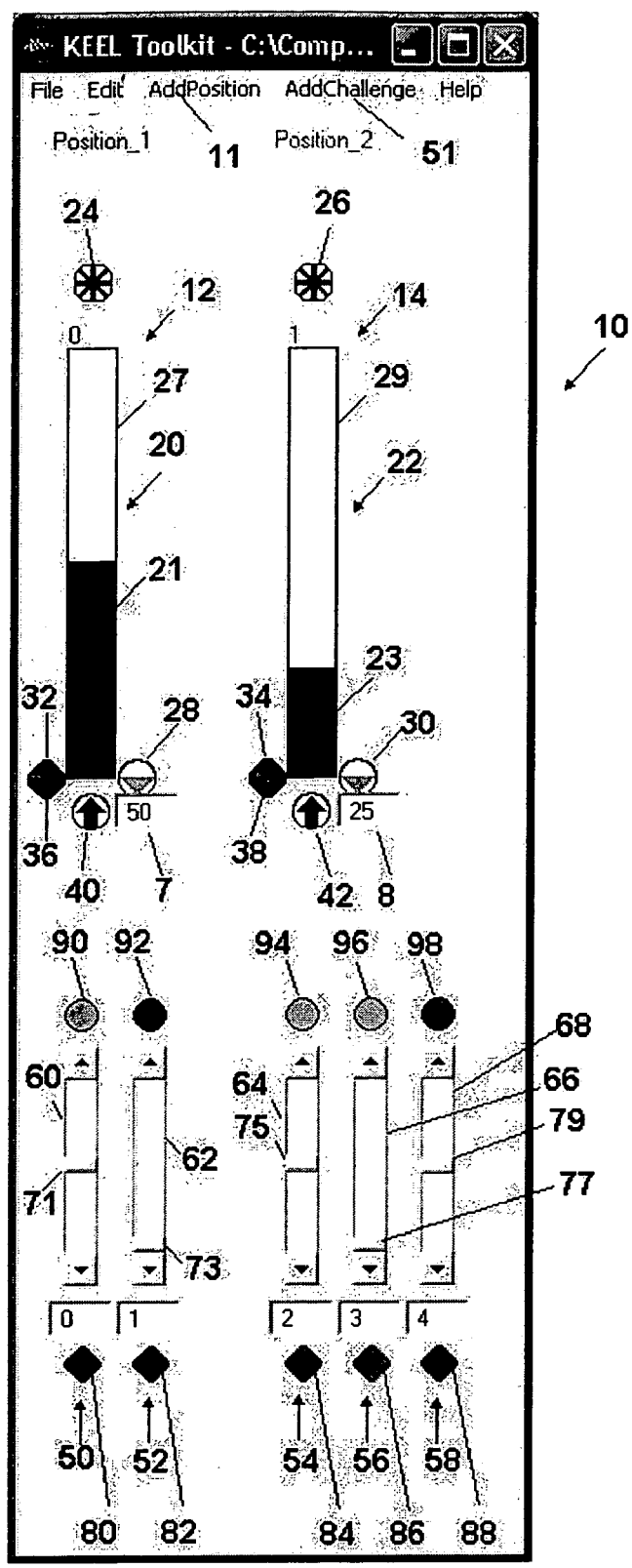
FIG. 1 provides a screen view of the main programming window of the graphical programming interface of the present invention showing two positions or decisions and five arguments or challenges illustrating the basic tree structure of positions and supporting and objecting arguments.

Referring now to FIG. 1, a graphical programming interface 10 in accordance with the present invention is shown as including two positions or actions 12 and 14. The positions 12 and 14 comprise position assemblies 20 and 22 that include rectangular importance boxes 27 and 29 and position value bars 21 and 23 disposed within rectangular boxes 27 and 29. The level of the value bars 21 and 23 provides a visual indication of the level of each position's modified value. The vertical height of boxes 27 and 29 provides a visual indication of the value of the importance of each position. The graphical programming interface 10 may include a large number of positions such as positions 12 and 14.

Figure 2:
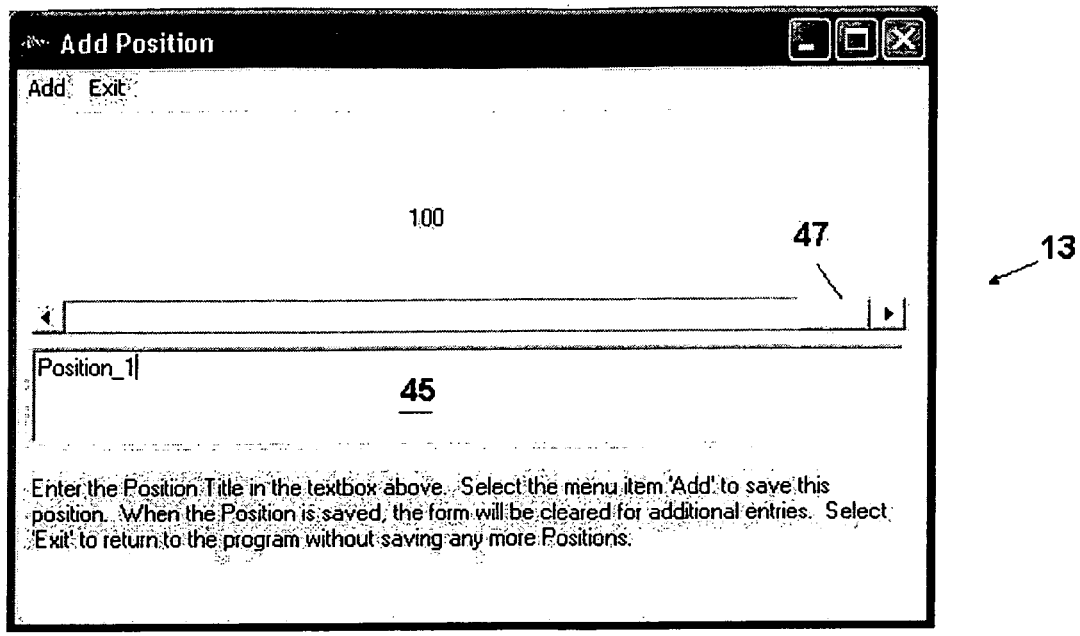
FIG. 2 provides a screen view of the Add Position menu for the graphical programming interface of the present invention showing the process of adding a position (or decision) to the main programming screen.

Referring now also to FIG. 2, once an application window is opened, positions such as positions 12 and 14 are created within the window by selecting an add position entry on a drop down menu or selecting an Add Position button 11 (FIG. 1) on a button bar which engages a drop down window 13 allowing the position to be named in a text box 45 and its importance value to be manually set by manipulating a slider 47. The interface software draws the positions within the application window with multiple positions being transversely spaced apart across the window.

Referring now again to FIG. 1, the positions 12 and 14 also include connection points by which functional linkages can be established. Importance connection points 24 and 26 are indicated by an icon showing an asterisk in a small irregularly shaped circle and are located immediately above the position assemblies. Threshold connection points 28 and 30 are indicated by an icon showing a small downward pointing triangle within a small circle and are moveably positioned along the right side of the position assemblies. Clipper upper limit connection points 32 and 34 are indicated by an icon showing a small pyramid and are moveably positioned along the left side of the position assemblies. Clipper lower limit connection points 36 and 38 are indicated by an icon showing a small upside down pyramid and are moveably positioned on the left side of the position assemblies below the upper limit connection points 32 and 34. Modified position value connection points 40 and 42 are indicated by an icon showing an upward pointing arrow within a small circle and are located immediately below the position assemblies. The connection points allow the positions and arguments to be functionally linked and combined together in a variety of ways using drag and drop techniques in order to form complex systems. Each position such as positions 12 and 14 includes importance, threshold, clipper upper limit, clipper lower limit and modified value connection points all or none of which may or may not be utilized in each case depending on the requirements of each application. The specific functionality associated with the connection points will be explained later.

The graphical interface 10 also includes three supporting and two objecting arguments or challenges 50, 52, 54, 56 and 58. The arguments 50, 52, 54, 56 and 58 include sliders 71, 73, 75, 77 and 79 that show input values normalized to a range of 0–100 within argument slider frames 60, 62, 64, 66 and 68. The argument values may be manually set or linked with outside input signals from sensors or the like or connected to various connection points associated with the positions 12 and 14 as will be explained later.

Figure 3:
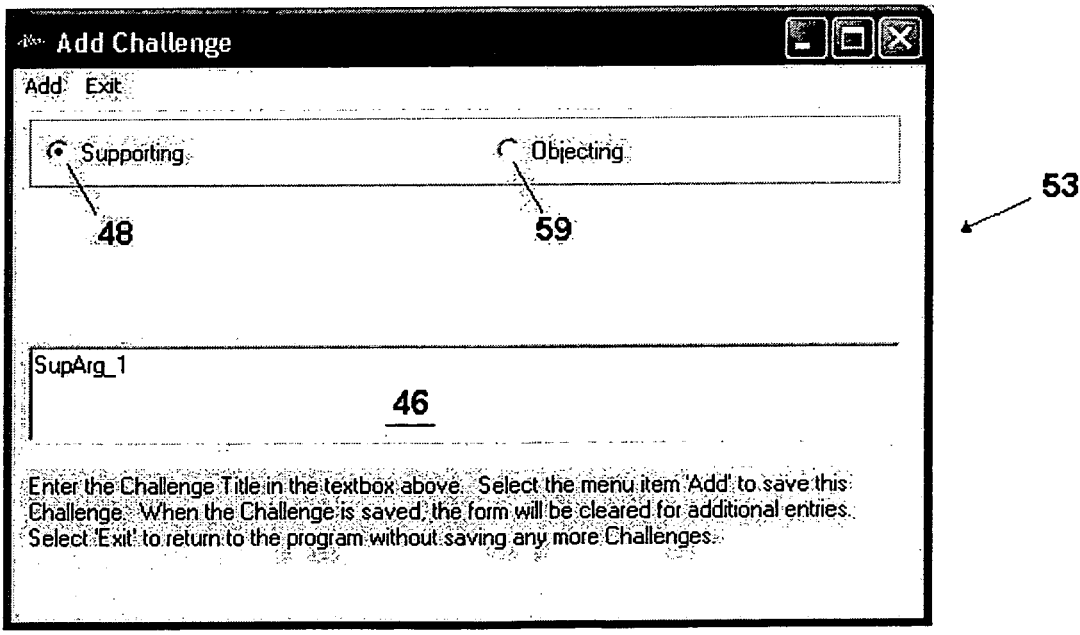
FIG. 3 provides a screen view of the Add Challenge (or argument) menu for the graphical programming interface of the present invention showing the process of adding an argument for a position on the main programming screen.

Referring now also to FIG. 3, arguments such as arguments 50, 52, 54, 56 and 58 are created by first selecting a position to which the argument will apply by clicking on the position and by selecting an add challenge entry on a drop down menu, or selecting an Add Challenge button 51 (FIG. 1) on a button bar which engages a drop down window 53 allowing the argument to be named in a text box 46 and for it to be designated as a supporting or objecting argument using radio buttons 48 and 59. The interface software draws the arguments within the application window below the positions with which they are associated with the supporting arguments and objecting arguments shown in the order they are created.

Referring now again to FIG. 1, the arguments 50, 52, 54, 56 and 58 also include connection points. Input connection points 80, 82, 84, 86 and 88 are indicated by icons in the shape of small diamonds which are located immediately below the argument slider bars and also by icons in the shape of small filled circles 90, 92, 94, 96 and 98 located immediately above the slider bars. The lighter colored circles such as the circles of icons 90, 94 and 96 indicate supporting arguments. The darker colored circles such as the circles of icons 92 and 98 indicate objecting arguments.

One supporting argument 50 and one objecting argument 52 are associated with the position 12 and two supporting reasons or arguments 54 and 56 and one objecting reason or argument 58 is associated with the position 14. The supporting and objecting arguments 50 and 52 which are associated with position 12 are accumulated and combined to derive the modified value for the position 12 as shown by the position value bar 21 and in text box 7. The supporting and objecting arguments 54, 56 and 58 which are associated with position 14 are accumulated and combined to derive the modified value for the position 14 as shown by the position value bar 23 and in text box 8. The graphical programming interface 10 may include a large number of both supporting and objecting arguments such as arguments 50, 52, 54, 56 and 58.

The modified value of position 12 is calculated in software in accordance with the evaluation algorithm:

$$PS_1 = PI * S_1 / 100$$

$$PO_1 = PS_1 * (100 - O_1)/100$$

$$PF = PO_1$$

Where—
PI=position importance value
$PS_1$=intermediate evaluation of supporting arguments after first (only) supporting argument
$S_1$=supporting argument value
$O_1$=objecting argument value
$PO_1$=intermediate evaluation of objecting arguments after the first (only) objecting argument
PF=final combined result—new modified position value The modified value of position 14 is calculated in software in accordance with the evaluation algorithm:

$$PS_1 = PI * S_1 / 100$$

$$PS_2 = ((PI - PS_1) * S_2 / 100) + PS_1$$

$$PO_1 = PS2 * (100 - O_1)/100$$

$$PF = PO_1$$

Where—
PI=position importance value
$PS_1$=intermediate evaluation of supporting arguments after the first supporting argument PS₂=intermediate evaluation of supporting arguments after the second supporting argument
$S_1$=first supporting argument
$S_2$=second supporting argument
$O_1$=first objecting argument
$PO_1$=intermediate evaluation of objecting arguments after the first (only) objecting argument
PF=final combined result–new modified position value All supporting arguments are successively combined into an overall supporting argument value. Each supporting argument increases the values of the intermediate modified value figures. Objecting arguments are then successively combined staring with the final figure of the modified value after all supporting arguments have been combined into an overall result. Each objecting argument reduces the values of the intermediate modified value figures. The final intermediate modified value figure is the final result.

In the general case the formula for combining supporting values may be shown as follows:

$$PS_1 = PI*S_1/100$$

$$PS_2 = ((PI-PS_1)*S_2/100) + PS_1$$

$$PS_3 = ((PI-PS_2)*S_3/100) + PS_2$$

$$\ldots$$

$$PS_N = ((PI-PS_{N-1})*S_N/100) + PS_{N-1}$$

Where—
PI=position importance value
$S_1$=first supporting argument
$S_2$=second supporting argument
$S_3$=third supporting argument
$S_N$=Nth and final supporting argument
$PS_1$=accumulated results after first supporting argument
$PS_2$=accumulated results after second supporting argument
$PS_3$=accumulated results after third supporting argument
$PS_N$=accumulated results after Nth and final supporting argument The objecting arguments work off of the results of combining the supporting arguments and reduce the resulting evaluation. In the general case the formula for combining objecting values may be shown as follows:

$$PO_1 = PS_N*(100-O_1)/100$$

$$PO_2 = PO_1*(100-O_2)/100$$

$$PO_3 = PO_2*(100-O_3)/100$$

$$\ldots$$

$$PO_N = PO_{N-1}*(100-O_N)/100$$

$$PF = PO_N$$

Where—
$PS_N$=accumulated results from supporting arguments
$O_1$=first objecting argument
$O_2$=second objecting argument
$O_3$=third objecting argument
$O_N$=Nth and final objecting argument
$PO_1$=accumulated results after the first objecting argument
$PO_2$=accumulated results after the second objecting argument
$PO_3$=accumulated results after the third objecting argument
$PO_N$=accumulated result after Nth and final objecting argument
PF=final combined result–new modified position value It should be noted that $PO_N = PO_{N-1}*(100-O_N)/100$ is algebraically and computationally equivalent to $PO_N = PO_{N-1} - (PO_{N-1}*O_N/100)$ In the alternative embodiment the modified value of the positions 12 and 14 may be calculated based on a different technique such as a difference between weighted sums of supporting and objecting arguments such as:

PV=(SV−OV)/(SV+OV)) for SV>OV, otherwise PV=0

For N supporting arguments and M objecting arguments
Where—
$SV = (S_1 + S_2 + S_3 \ldots + S_N)$
$OV = (O_1 + O_2 + O_3 \ldots + O_M)$ FIG. 1 also graphically illustrates the interaction between positions 12 and 14 and arguments 50, 52, 54, 56 and 58. The supporting argument 50 is manually set to a value of 50 while the objecting argument 52 is set to zero. Consequently, the modified value of position 12 can be seen at text box 7 as registering at 50 and likewise can be seen to be at about 50 by the level of the position value bar 21. The supporting argument 54 is manually set to a value of 50 while the objecting argument 58 is set to a value of 50. Consequently, the modified value of position 14 can be seen at text box 8 as registering at 25 and likewise can be seen to be at about 25 by the level of the position value bar 23.

Figure 4:
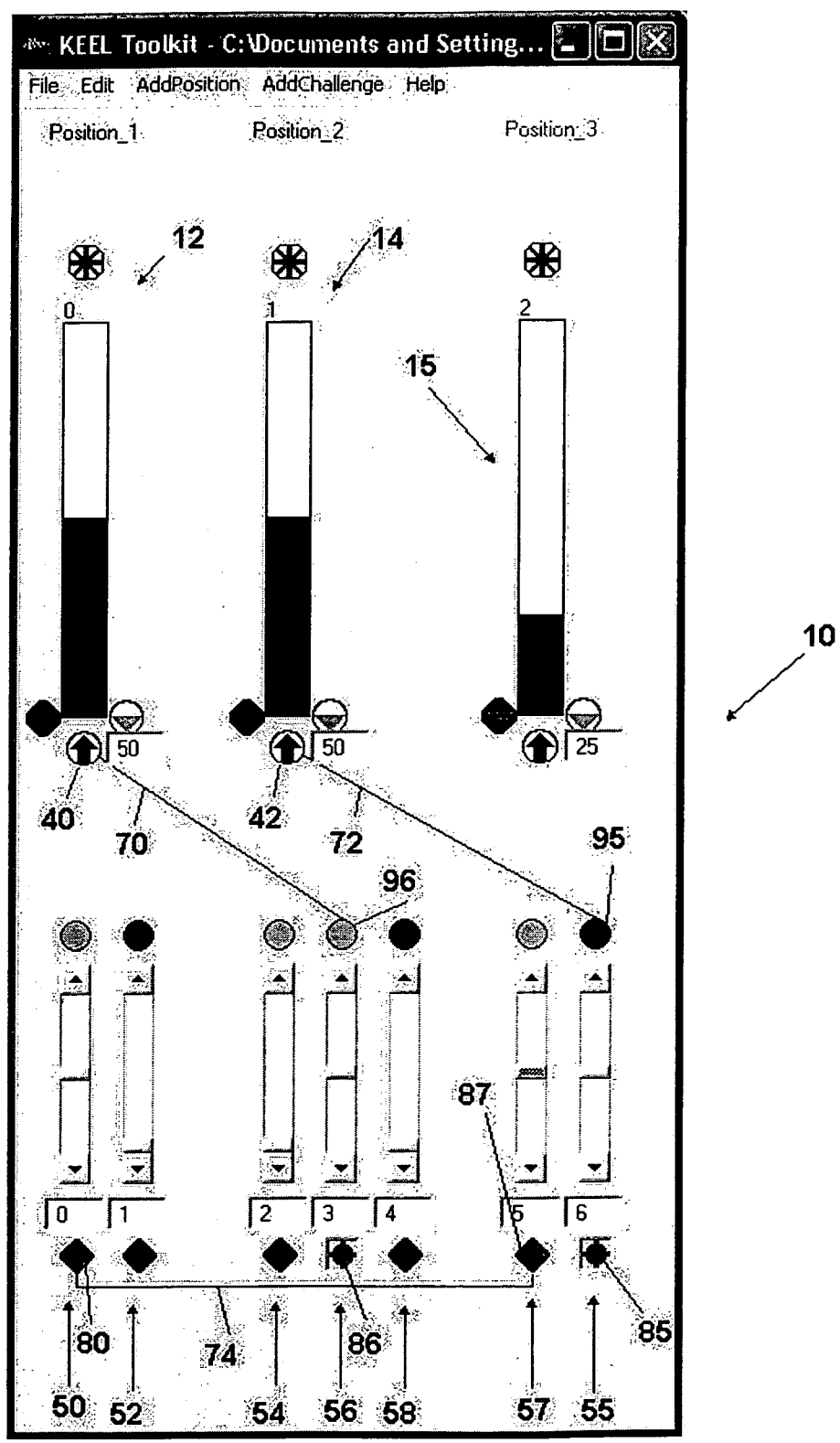
FIG. 4 provides a screen view of the main programming window of the graphical programming interface of the present invention illustrating linkages between positions and arguments and more specifically showing three positions and seven arguments with two of the positions linked to arguments for other positions so that the argument values are controlled by the modified values of those two positions.

Referring now to FIG. 4, the operation of modified position to argument connections or linkages 70 and 72 between position 12 and argument 56 associated with position 14 and between position 14 and argument 55 associated with position 15 are shown. The modified value of position 12 is linked or wired at modified value connection point 40 to the argument 56 at argument connection point 96. The modified value of position 14 is linked or wired at modified value connection point 42 to the argument 55 at argument connection point 95. The linkages are performed by clicking on the connection point 40 with the cursor and then dragging and dropping the cursor on the connection point 86 and by clicking on the connection point 42 with the cursor and then dragging and dropping the cursor on the connection point 85. It should be noted that while drag and drop techniques are efficient and convenient the interface could provide for the linkages could be formed by alternative techniques. The linkages 70 and 72 are graphically represented on the interface by thin lines extending between the connection points of the affected positions and arguments. All linkages are graphically represented on the interface by lines running between connection points. The linkages represent functional relationships between the positions, arguments and features associated with the connection points. It should be noted that once linkages are established the icons at the connection points 86 and 85 of the arguments 56 and 55 which are being driven by linkages 70 and 72 from other positions change from diamonds into small circles having four points. It should also be noted that the linkages are graphically depicted as extending between points 40 and 96 and 42 and 95 for the sake of convenience and to avoid clutter on the interface 10. The points 96 and 95 are not operatively active for creating new linkages but serve merely as diagrammatically convenient attachment points. In accordance with the functional relationship established by the linkages 70 and 72, the modified values of positions 12 and 14 drive the values of arguments 56 and 55. For illustrative purposes, the supporting argument 50 is manually set to an argument value of 50. Accordingly, the modified value of the position 12 registers as 50. This value drives the argument 56 through the link 70 to a value of 50 which in turn drives the position 14 to a value of 50. Since for illustrative purposes, the supporting argument 50 is manually set to an argument value of 50, this drives argument 57 to a value of 50 through link 74. The modified value of the position 14 registers as 50. This value drives the objecting argument 55 through the link 72 to a value of 50 which in turn drives the position 15 to a value of 25 in consideration of the fact that the supporting argument 57 is set to 50 via link 74. The graphical programming interface 10 may include a large number of linkages such as the linkages 70 and 72.

Referring again to FIG. 4, the supporting arguments 50 and 57 are connected or linked by linkage 74 running below the arguments 50, 52, 54, 56, 58, 57. The arguments 50 and 57 may thereby be conveniently set to identical values. Changes in one argument value will drive the other argument value. The linkage 74 is performed by clicking on the connection point 80 with the cursor and then dragging and dropping the cursor on the connection point 87 although the same linkage could be established by clicking on the connection point 87 and then dragging and dropping the cursor on connection point 80. The linkage 74 is graphically represented by a thin line extending between connection points. The graphical programming interface 10 may include a large number of linkages such as the linkages 74 which may even connect multiple arguments.

Figure 5:
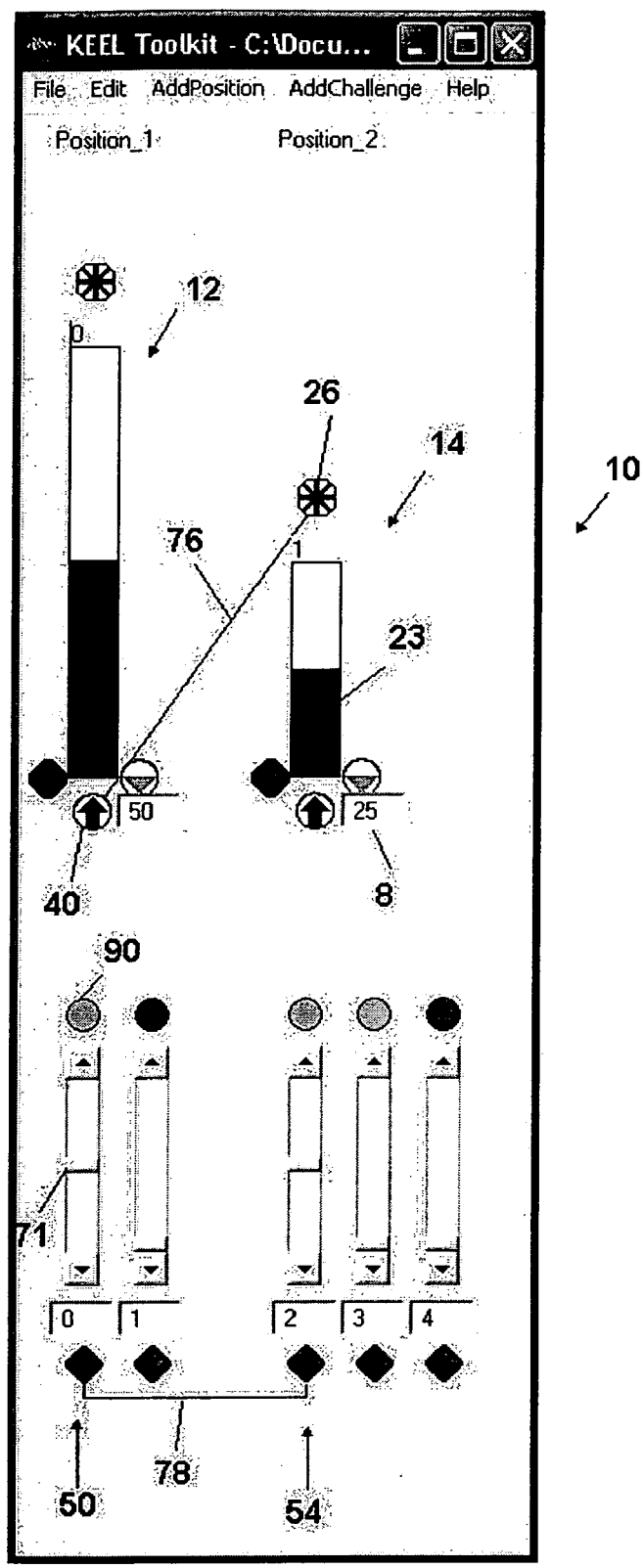
FIG. 5 provides a screen view of the main programming window of the graphical programming interface of the present invention illustrating linkages between positions and linkages between arguments and more specifically showing two positions and five arguments with the importance of one position controlled by the modified value of another position and with one argument value controlled by another argument value.

Referring now to FIG. 5, the operation of a modified position to position importance connection or linkage 76 between positions 12 and 14 is shown. The modified value of position 12 is linked or wired at modified value connection point 40 to the position 14 at importance connection point 26. The linkage is created by clicking on the connection point 40 with the cursor and thereafter dragging and dropping the cursor on the connection point 26. The linkage 76 is graphically represented by a thin line extending between connection points (as are all linkages). The linkage 76 represents a functional relationship between the position 12 and its modified value and the position 14 and its importance value. The modified value of the position 12 drives the value of the importance of position 14. The importance of a position "scales" its modified value from 0–100 on a percent basis so that for example an importance of 60 reduces a modified value of 80 to 48. For illustrative purposes, the supporting argument 50 is manually set to an argument value of 50 with slider 71. Accordingly, the modified value of the position 12 registers as 50. The argument 50 also drives the argument 54 through the action of the link 78 to a value of 50. The linkage 76 drives the importance of position 14 to a value of 50 in accordance with the modified value of position 12. The modified value of position 14 is driven to 25 as shown at text box 8 and by position bar 23 by the value of argument 54 as adjusted in accordance with the importance determined by position 12 through linkage 76. It should also be noted that the importance of any position can be manually set at the time of its creation by adjusting the slider 17 associated with its drop down window 13 as shown in FIG. 2. The graphical programming interface 10 may include a large number of linkages such as the linkage 76.

Figure 6:
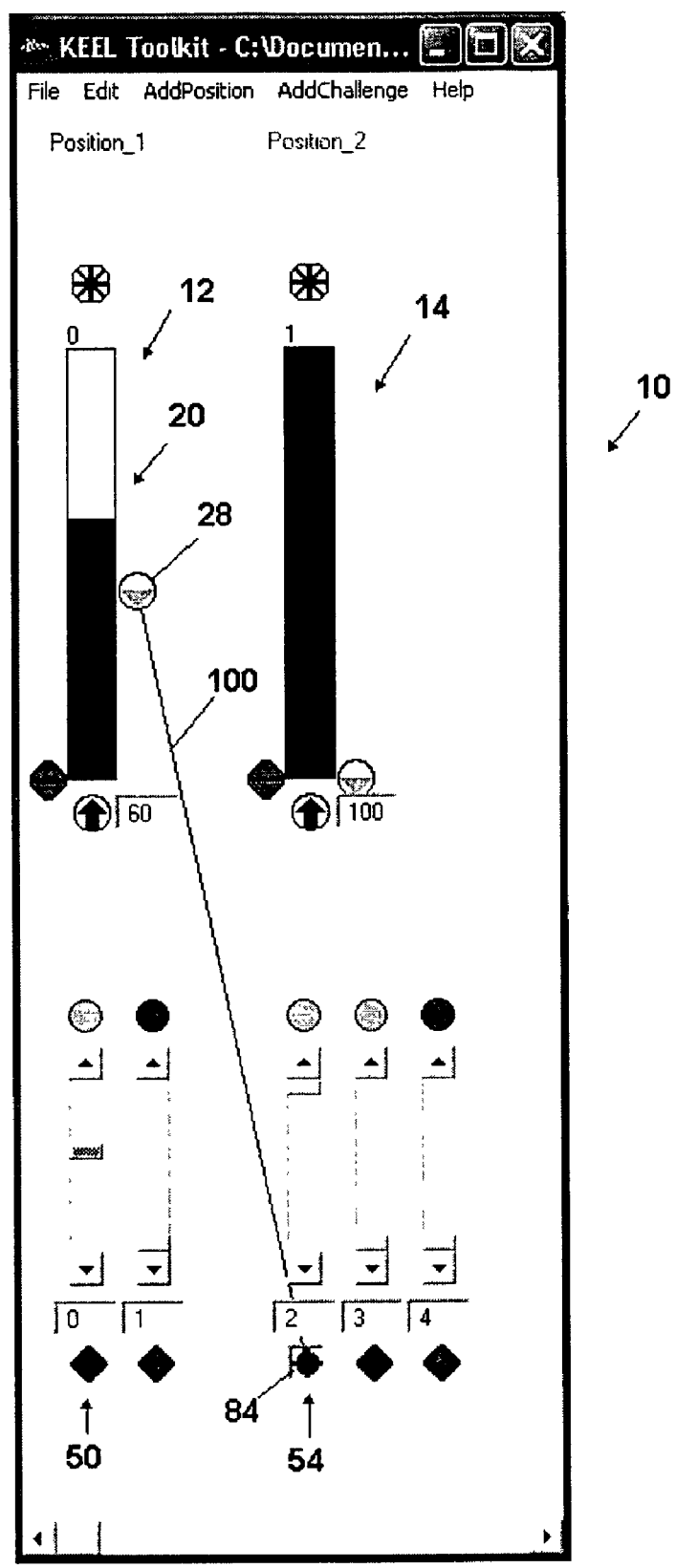
FIG. 6 provides a screen view of the main programming window of the graphical programming interface of the present invention illustrating linkages between thresholds and arguments and more specifically showing two positions and five arguments with an argument value for one position controlled by the threshold of another position.

Referring now to FIG. 6, the operation of a threshold to argument connection or linkage 100 between position 12 and argument 54 and its associated position 14 is shown. The set point of the threshold for position 12 can be adjusted by having its connection point clicked with the cursor and dragged and dropped anywhere along the right side of the position assembly 20 while the control key and the right mouse button are depressed to set the threshold at any value between 0 and 100. The threshold connection point graphically represents the threshold's set point for triggering its functions in accordance with the height of its vertical position along the left side of the position assembly. It should however be understood that the exact sequence of keystrokes to perform actions like moving threshold points is a matter of design choice and that the interface could be programmed to use different sequences without affecting the functionality of the software. The threshold for position 12 is linked or wired at threshold connection point 28 to argument 54 at argument connection point 84. The linkage 100 is performed by clicking on the threshold connection point 28 with the right mouse button and then dragging and dropping the cursor onto the connection point 84. In accordance with the linkage 100, the threshold thereby drives the value of the of argument 54 to either 0 if the modified value of position 12 is equal to or below the threshold or to 100 if the modified value of the position 12 is above the threshold. For illustrative purposes, the supporting argument 50 is manually set to an argument value of 60. The modified value of the position 12 registers as 60. By operation of the threshold for position 12 and linkage 100 this value drives the argument 54 to a value of 100 since the modified value of position 12 is above the threshold and the modified value of position 14 is then driven to 100 by argument 54. The graphical programming interface 10 may include a large number of linkages such as the linkage 100.

Figure 7:
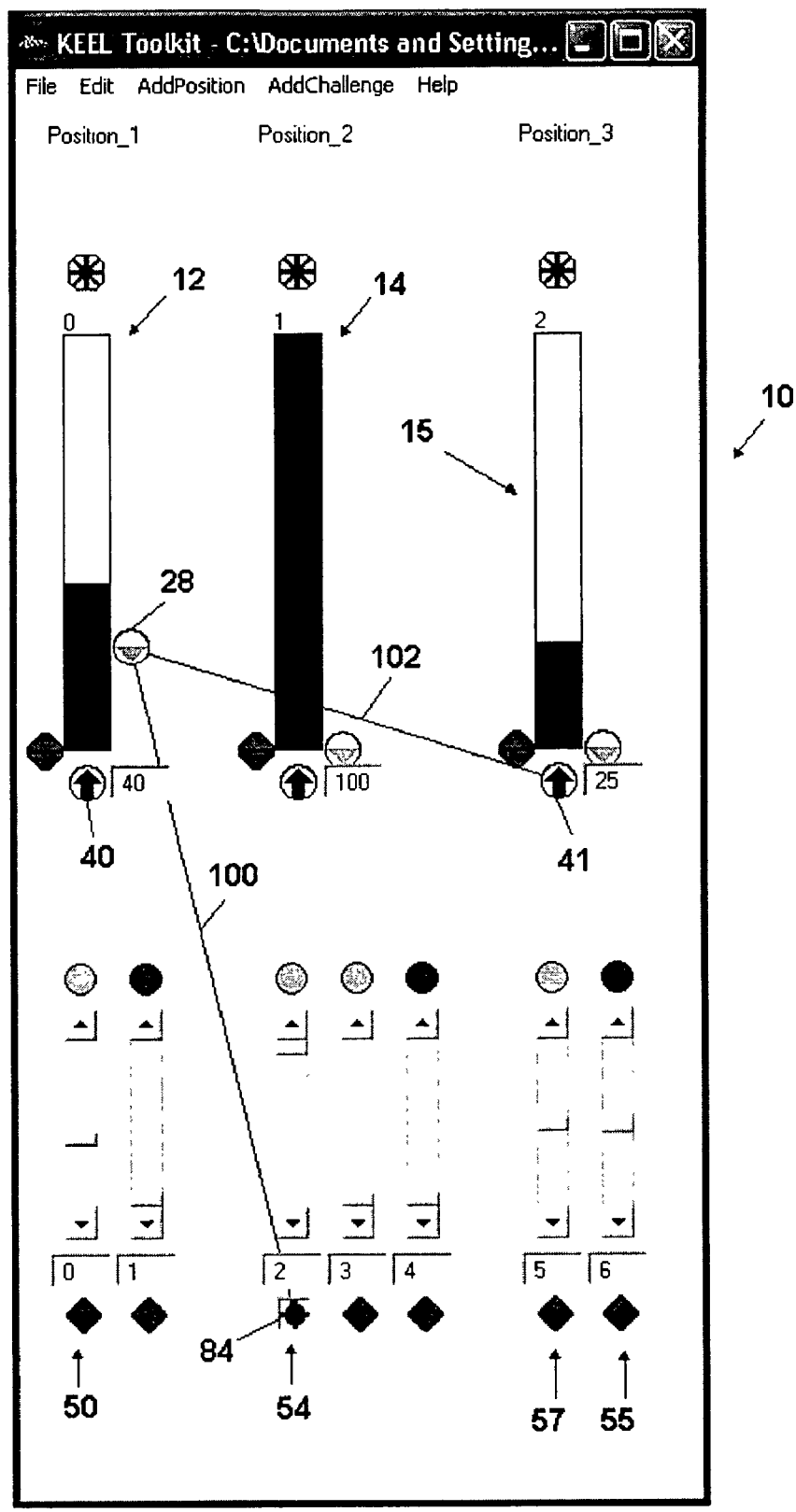
FIG. 7 provides a screen view of the main programming window of the graphical programming interface of the present invention illustrating linkages between positions and thresholds and more specifically showing three positions and seven arguments with the threshold set point of one position controlled by the modified value of another position and with an argument value for yet another position controlled by the threshold.

Referring now to FIG. 7, the operation of a threshold to argument connection or linkage 100 between position 12 and argument 54 and its associated position 14 is shown at the same time as the operation of a modified position to threshold linkage 102 between positions 15 and 12 is illustrated. The linkage 102 allows the set point of the threshold to be automatically adjusted. The threshold for position 12 is linked or wired at threshold connection point 28 to argument 54 at argument connection point 84 as previously described with respect to FIG. 6. The modified value of position 15 is linked at connection point 41 to the threshold associated with position 12 at threshold connection point 28. The linkage 102 is created by clicking on the modified value connection point 41 with the cursor and then dragging and dropping the cursor on the threshold connection point 28. In accordance with the linkage 102 the set point of the threshold for position 12 is controlled to be the same as the modified position value of position 15. For illustrative purposes, the supporting argument 50 is manually set to an argument value of 40 and the supporting and objecting arguments 55 and 57 are manually set to argument values of 50. The modified value of the position 12 registers as 40. By operation of linkage 102 the threshold set point for position 12 is set to 25 which corresponds to the modified value of position 15. By operation of the linkage 100 the threshold drives the argument 54 to a value of 100 since the modified value of position 12 is above the threshold set point of 25 as controlled by position 15 and the modified value of position 14 is then driven to 100 by argument 54. The graphical programming interface 10 may include a large number of linkages such as the linkages 100 and 102.

Figure 8:
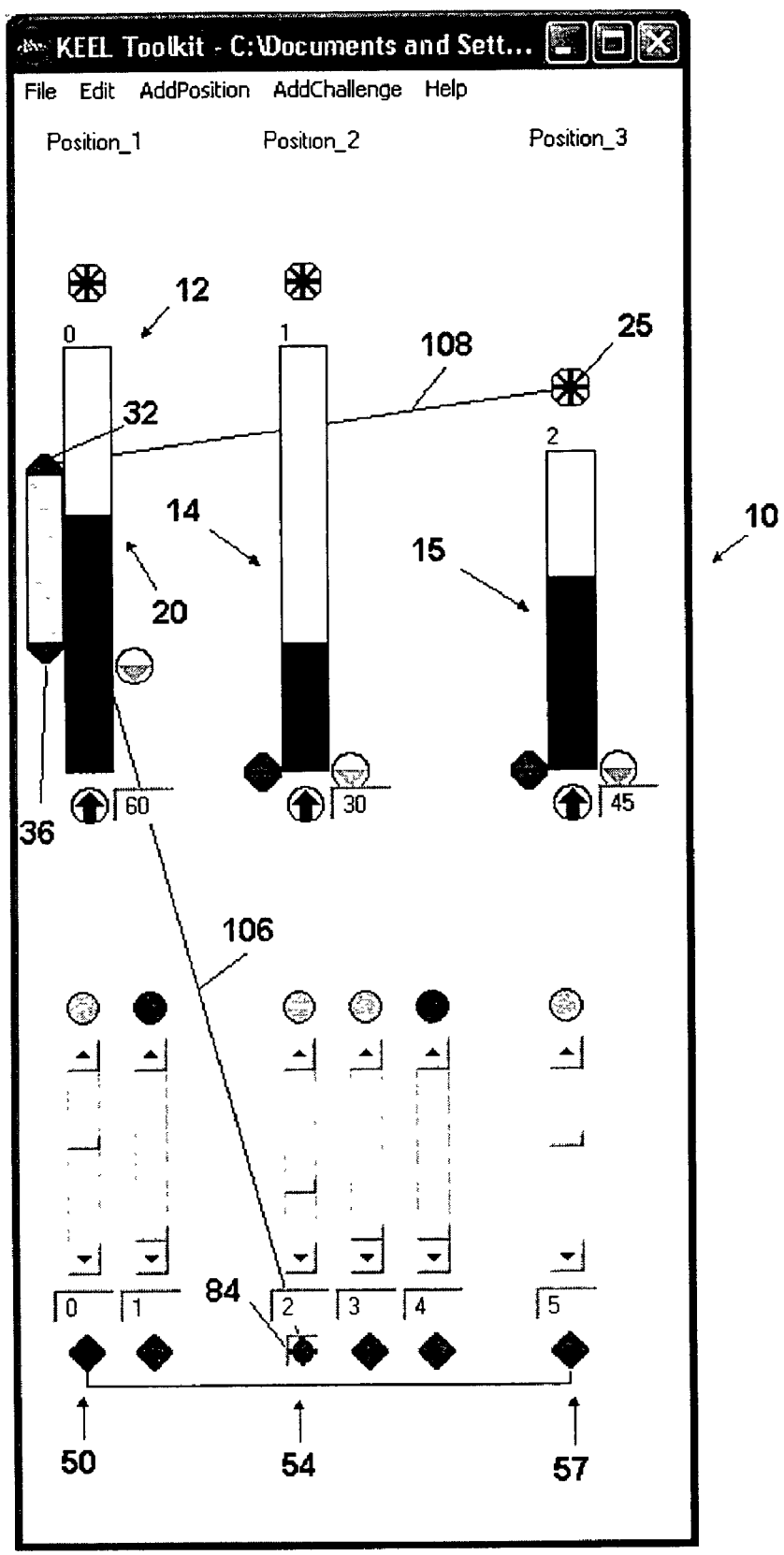
FIG. 8 provides a screen view of the main programming window of the graphical programming interface of the present invention illustrating linkages between clipper windows and positions and arguments and linkages between arguments and more specifically showing three positions and six arguments with the importance of one position controlled by the clipper window of another position and with an argument value for yet another position also controlled by the clipper window and also with one argument controlling the value of another argument.

Referring now to FIG. 8, the operation of a clipper or clipper window to argument connection or linkage 106 between position 12 and argument 54 and its associated position 14 is shown as well as the operation of a clipper or clipper window to position importance linkage 108 between position 12 and position 15. The operation of the clipper window may be adjusted by having its upper and lower limit connection points 32 and 36 clicked with the cursor and dragged and dropped anywhere along the left side of the position assembly 20 while the control key and right mouse button are depressed to set the clipper upper and lower limit set points at any values between 0 and 100 (so long as the lower limit is below the upper limit). The clipper upper and lower limit connection points graphically represent the clipper's set points for triggering its functions in accordance with their vertical position along the left side of their position assembly. For general purposes it should be noted that a clipper window's upper set point is based on a percentage of the position importance and the clipper window's lower set point is based on a percentage of the upper clipper window set point. Knowing the position importance value and percentage values of the upper and lower clipper set point values, count values can be calculated for both upper and lower clipper set points when these count values are needed to drive argument values. The upper connection points of clippers such as the connection point 32 of the clipper for position 12 are used for linking the outputs of clippers to other connection points. The clipper window for position 12 is linked or wired at clipper connection point 32 to argument 54 at argument connection point 84. The clipper window for position 12 is also linked or wired at clipper connection point 32 to position 15 at importance connection point 25. The linkages 106 and 108 are constructed by clicking on the clipper connection point 32 with the cursor and then dragging and dropping the cursor onto the connection point 84 and by clicking on the clipper connection point 32 with the cursor and then dragging and dropping the cursor onto the connection point 25. It should be noted that clipper windows have both percentage and derived count value functions associated with them. The count values are used when they drive argument values and the percent values are used when they drive importance values. In accordance with linkage 108 the clipper window for position 12 thereby drives the value of the importance of position 15 to the clipper's percent value. In accordance with the linkage 106, the clipper window for position 12 also drives the value of the argument 54 to the clipper's derived count value. The count value of a clipper window is a function of the amount by which the modified value of the position it is associated with exceeds its clipper lower limit set point. However, the count value of a clipper window is limited by its upper limit set point and its value will not increase further once its upper limit set point is reached even if the modified value of the position with which it is associated increases beyond the upper set point. For illustrative purposes, the supporting argument 50 is manually set to an argument value of 60. The modified value of the position 12 registers as 60. By operation of the clipper window for position 12 and linkage 106 the argument 54 is driven to a value of 30 since the modified value of position 12 is 30 counts above the clipper's lower limit (while still below the upper limit). The percent value of a clipper is a function of the amount by which the modified value of the position it is associated with exceeds its clipper lower limit set point as a percent of the total range of the clipper or rather as a percent of the difference between the upper and lower limit set points. For illustrative purposes, the supporting argument 50 is manually set to an argument value of 60. The modified value of the position 12 registers as 60. By operation of the clipper window for position 12 and linkage 108 the importance of position 15 is driven to 75 since the modified value of position 12 is 75 percent of the way between the clipper's lower limit and upper limit. The graphical programming interface 10 may include a large number of linkages such as the linkages 106 and 108.

Figure 9:
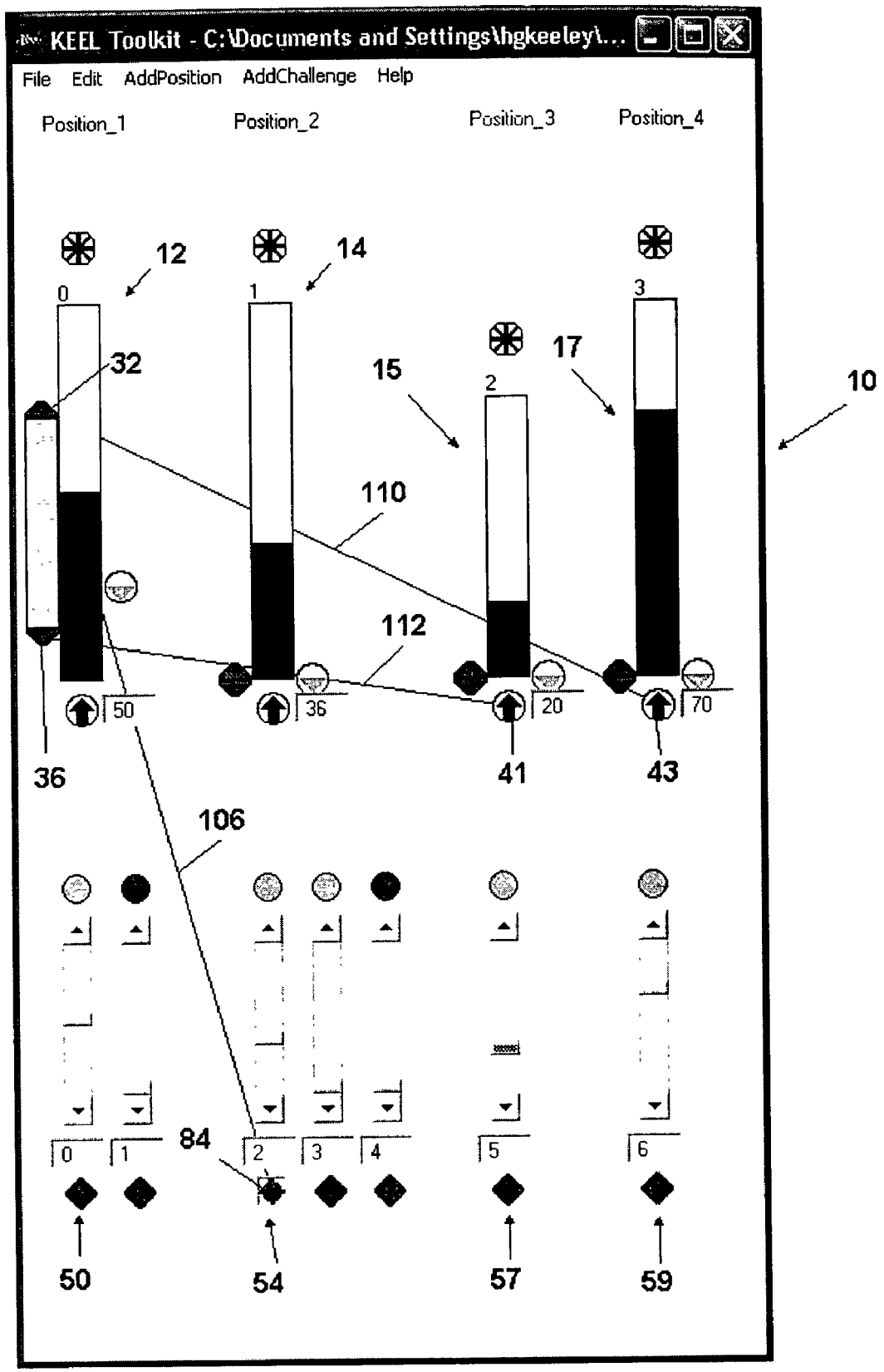
FIG. 9 provides a screen view of the main programming window of the graphical programming interface of the present invention illustrating linkages between clipper windows and positions and arguments and more specifically showing four positions and seven arguments with the upper limit clipper window set point of a first position controlled by the modified value of a fourth position and lower limit clipper window set point of that first position controlled by the modified value of a third position and with an argument value for a second position then controlled by the clipper window.

Referring now to FIG. 9, the operation of position modified value to clipper upper limit and position modified value to clipper lower limit connections or linkages 110 and 112 between positions 15 and 17 and the clipper associated with position 12 are shown. The linkages 110 and 112 allow the operation of the clipper window to be modified by having the set points associated with its upper and lower limit connection points 32 and 36 automatically adjusted. The modified value of position 17 is wired or connected at connection point 43 to clipper upper limit connection point 32. Similarly, the modified value of position 15 is wired or connected at connection point 41 to clipper lower limit connection point 36. The linkages 110 and 112 are created by clicking on the position modified value connection point 43 with the cursor and then dragging and dropping the cursor onto the clipper upper limit connection point 32 and by clicking on the position modified value connection point 41 with the cursor and then dragging and dropping the cursor onto the clipper lower limit connection point 36. The clipper window for position 12 is also linked or wired at clipper connection point 32 to argument 54 at argument connection point 84 by linkage 106. The modified values of positions 17 and 15 thereby drive the values of the set points for the upper and lower limits of the clipper of position 12. For illustrative purposes, the supporting argument 50 is manually set to an argument value of 50. The modified value of the position 12 registers as 50. By operation of the linkages 110 and 112 the set point of the clipper upper limit is set to 70 percent (or 70 counts) and the set point of the clipper lower limit is set to 20 percent or 14 counts) in accordance with the modified values of the positions 17 and 15. The clipper window for position 12 and linkage 106 drive the modified value of position 14 to 36 since the modified value of position 12 is 36 counts higher than the clipper lower limit count or set point of 14. The graphical programming interface 10 may include a large number of linkages such as the linkages 106, 110 and 112.

Figure 10:
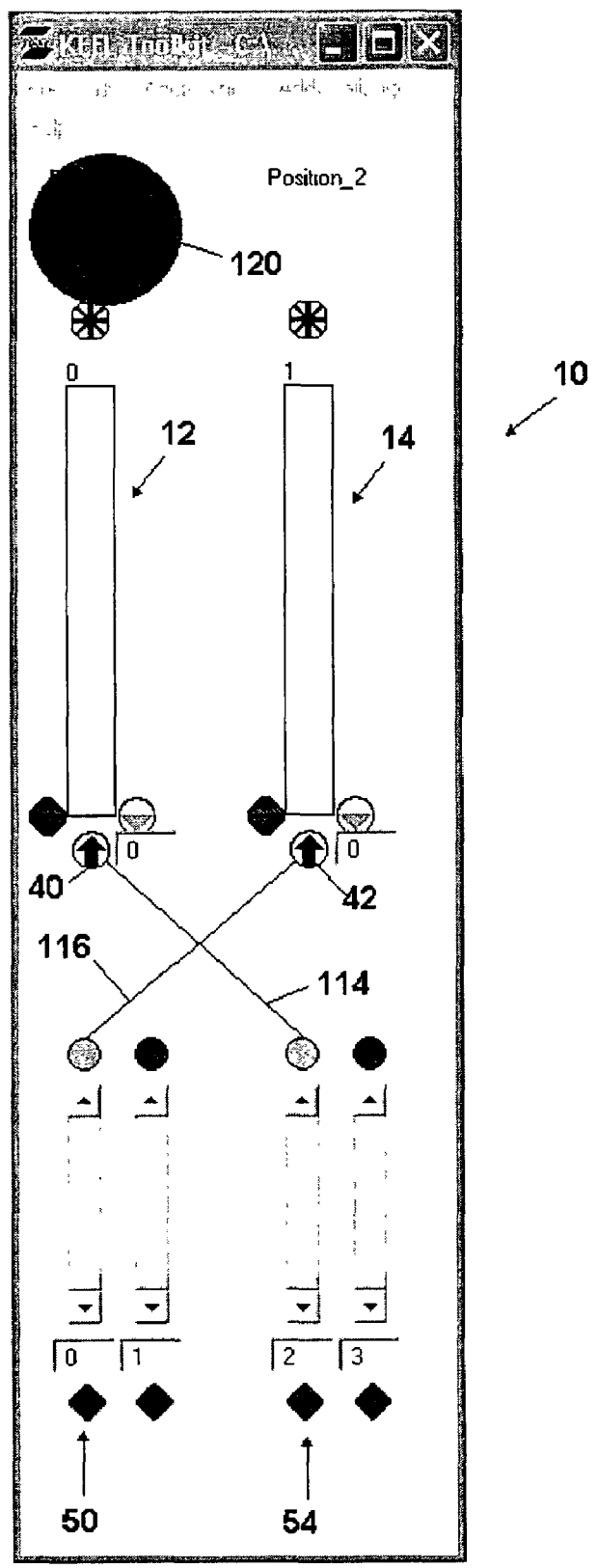
FIG. 10 provides a screen view of the main programming window of the graphical programming interface of the present invention illustrating linkages between positions which may create feedback problems and more specifically showing two positions and four arguments with an argument for a first position controlled by the modified value of a second position and an argument for the second position controlled by the modified value of the first position.

Referring now to FIG. 10, the position modified value to argument linkages 114 and 116 link position 12 to position 14 through argument 54 and position 14 to position 12 through argument 50 in a potentially unstable feedback loop. The interface program detects this and presents the icon 120 in the shape of a large circular ball above the first position 12 as a warning. The developer using the interface may manually override this warning using menu entries under the Edit menu as will be later described.

Figure 11:
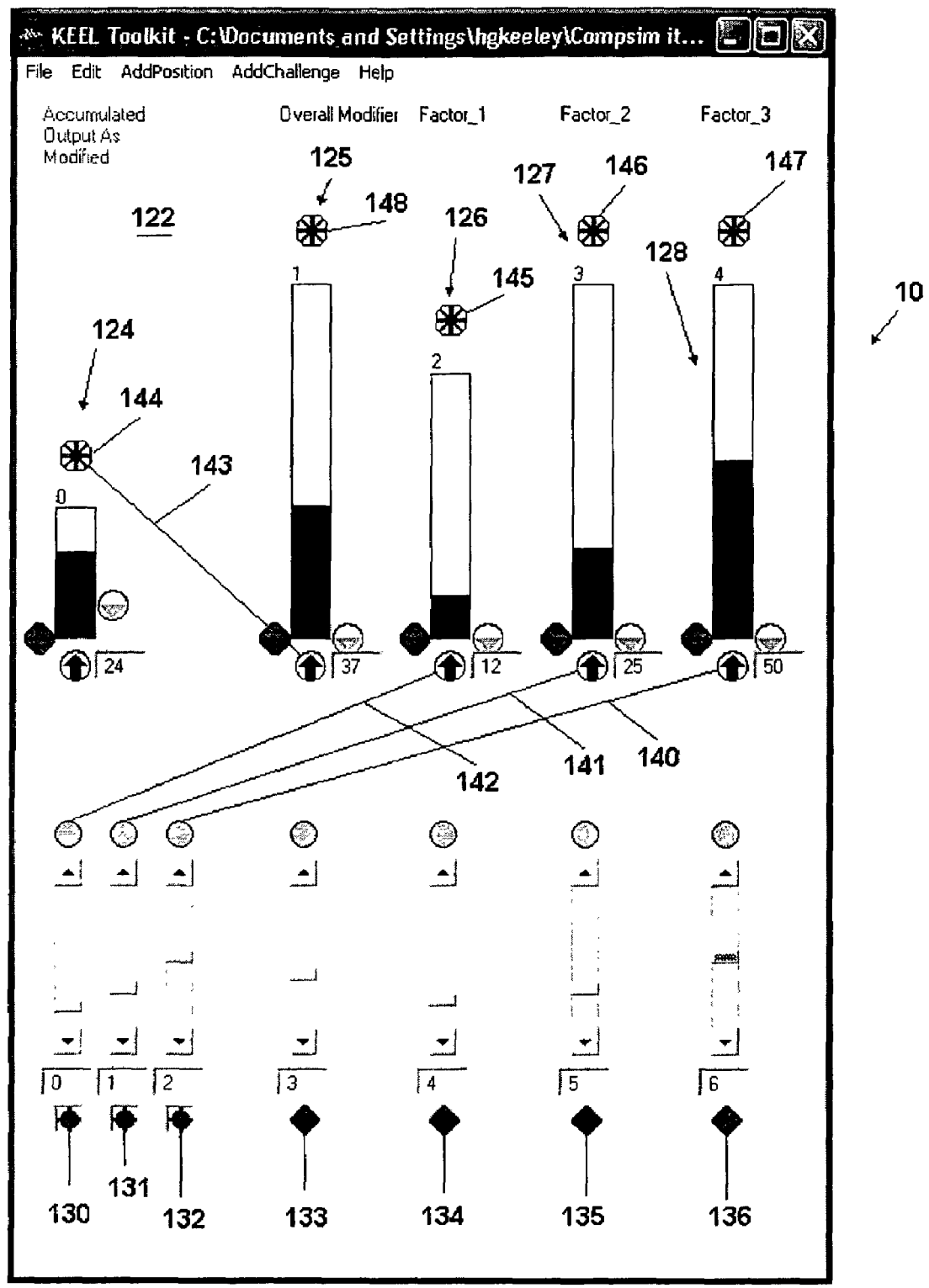
FIG. 11 provides a screen view of the main programming window of the graphical programming interface of the present invention illustrating a sample program in which three input factors are combined and modified by a fourth input to produce a final result and more specifically showing five positions and seven arguments having various linkages.

Referring now to FIG. 11, the sample interface program 122 includes five positions 124–128, seven arguments 130–136 and four linkages 140–143. The position modified value to argument linkages 140–142 are operative for transferring the modified values from the positions 126–128 to the position 124 through the arguments 130–132. These modified values reflect the arguments 134–136 that act as inputs to the system. The modified arguments are scaled relative to one another in accordance with the fixed importance values of the positions 126–128. However, the position 125 and its supporting argument 133 control the importance of position 124 through the position modified value to importance linkage 143. It should also be noted that the modified value of position 125 is also scaled in accordance a fixed importance value. The position 125 effectively modifies or controls the overall combined values of positions 126–128 and the inputs represented by arguments 133–136 as they are accumulated at position 124. In overall function the program collects, scales, and combines a set of inputs and allows the accumulated value to be modified and then expressed as a single output for control purposes.

Figure 12:
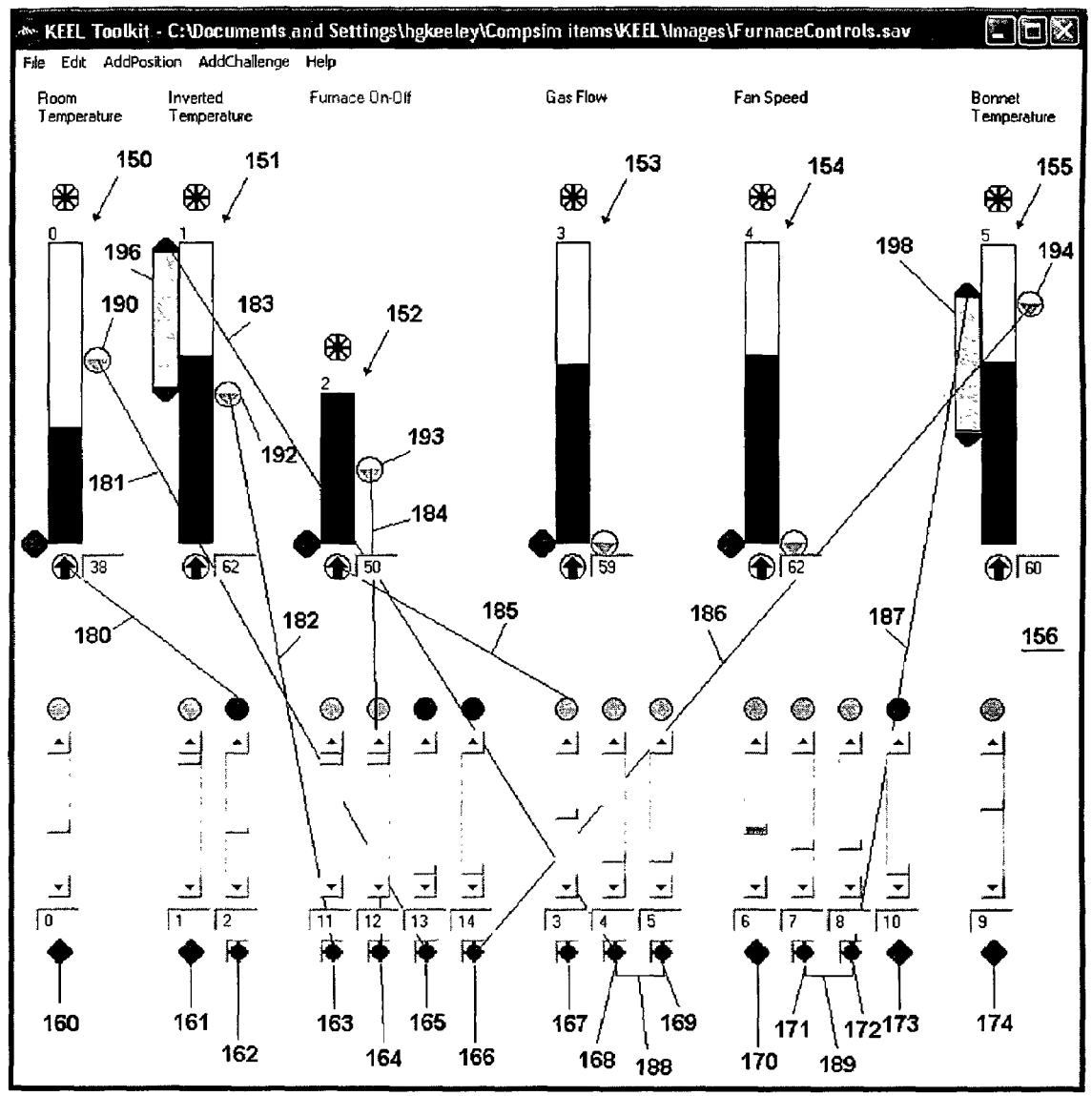
FIG. 12 provides a view of the main programming screen of the graphical programming interface of the present invention illustrating a sample program for controlling a furnace in which the gas flow and fan speed are controlled in accordance with room temperature and bonnet temperature and more specifically showing six positions and fifteen arguments having a large variety of linkages.

Referring now to FIG. 12, the furnace control program 156 includes six positions 150–155, fifteen arguments 160–174 and ten linkages 180–189. The position 150 reflects room temperature within the input range as provided at argument 160 as the primary system input. The position 151 reflects "inverted" room temperature as transferred from position 150 through objecting argument 162. As room temperature goes down the modified value of position 151 goes up thereby allowing the functionality of threshold 192 and clipper window 196 to be properly enabled. The position 152 acts as an on-off switch for the furnace. When the temperature falls and the inverted temperature rises above the set point of the threshold 192 the furnace is turned on through the action of linkage 182 which drives the argument 163 to full value and position modified value of position 152 to its full value of 50 as scaled by the fixed importance of position 152. The position 153 is latched "on" or at full value by the linkage 184 from the threshold 193 to the argument 164 which drives the position 153 itself Even if the modified value of the position 151 falls below the threshold 192 thereby dropping the value of the argument 163 to zero the position 152 will stay at full value due to the threshold 193 driving the argument 164. The modified value of the position 152 can only be "reset" by the action of the linkage 181 driving the objecting argument 165 to full value when the modified value of position 150 (reflecting room temperature) rises above the threshold 190. The furnace is thereupon turned off as the modified value of position 152 is driven to zero. Position 153 represents the volume of gas flow to be supplied to the burner of the furnace and is controlled by linkages 185 and 183. Linkage 185 operates to apply the modified value of position 152 to argument 167 that provides a minimum value of 50 to the gas flow whenever the furnace is turned on and the position 152 is accordingly at full value. Linkage 183 operates to apply the count value of clipper window 196 of position 151 to argument 168 which augments the gas flow as the room temperature falls and the inverted temperature rises within the range above the lower limit of the clipper 196. Arguments 168 and 169 are connected together by linkage 188 whereby the value of argument 168 drives argument 169 thereby increasing the contribution of the clipper count value to the modified value of the position 153 and further increasing the gas flow. Position 154 represents the speed of the furnace fan and is controlled by the values of arguments 170 and 173 and the linkage 187 which drives arguments 171 and 172. Argument 170 is manually set to a fixed value to provide for a minimum fan speed 18 to provide for continuous ventilation unless the fan is manually turned off by supply of a full value input at objecting argument 173. Linkage 187 operates to apply the count value of clipper window 198 of position 155 to argument 172 which augments the fan speed to provide more cooling and heat transfer as the furnace bonnet temperature which is input at argument 174 and represented by the modified value of position 155 rises within the range above the lower limit of the clipper window 198. Arguments 171 and 172 are connected together by linkage 189 whereby the value of argument 172 drives argument 171 thereby increasing the contribution of the clipper count value to the modified value of the position 154 and further increasing the fan speed. The threshold 194 for position 155 is connected by linkage 186 to objecting argument 166 of position 152. The set point of the threshold is adjusted to reflect the maximum safe operating temperature for the furnace. If the threshold 194 is exceeded by the modified value of position 155 representing the furnace bonnet temperature the threshold 194 and linkage 186 operate to drive the objecting argument 166 to full value and drive the modified value of position 152 to zero thereby shutting off the furnace except for the operation of the fan at minimum ventilation speed.

Figure 33:
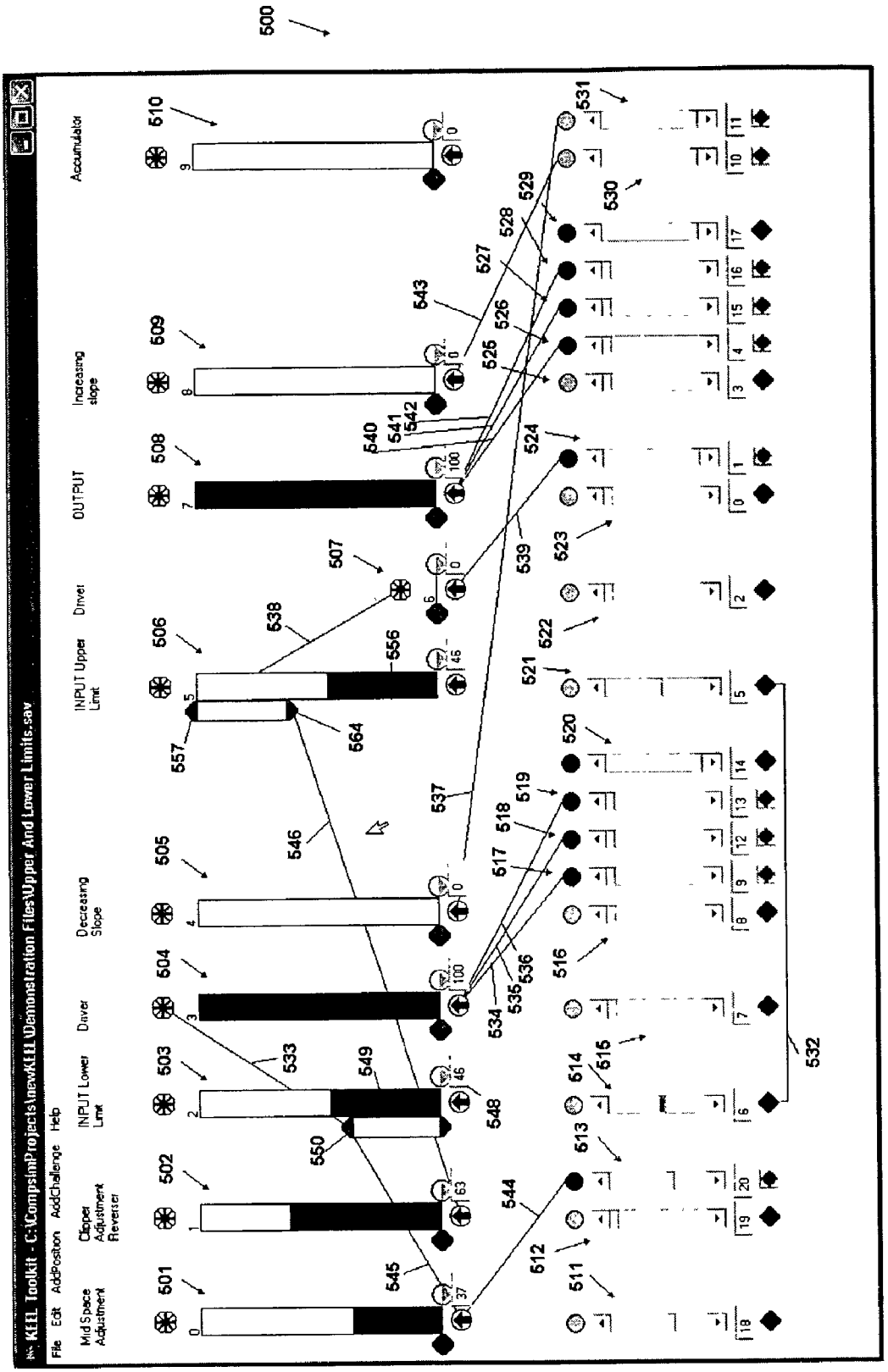
FIG. 33 provides a screen view of the main programming window of the graphical programming interface of the present invention illustrating a sample program for a portion of a medical diagnostic system in which an output signal indicative of the health risk is generated in response to an input signal which may fall high or low with respect to a normal input range and more specifically showing ten positions and twenty arguments having a large variety of linkages.
Figure 34:
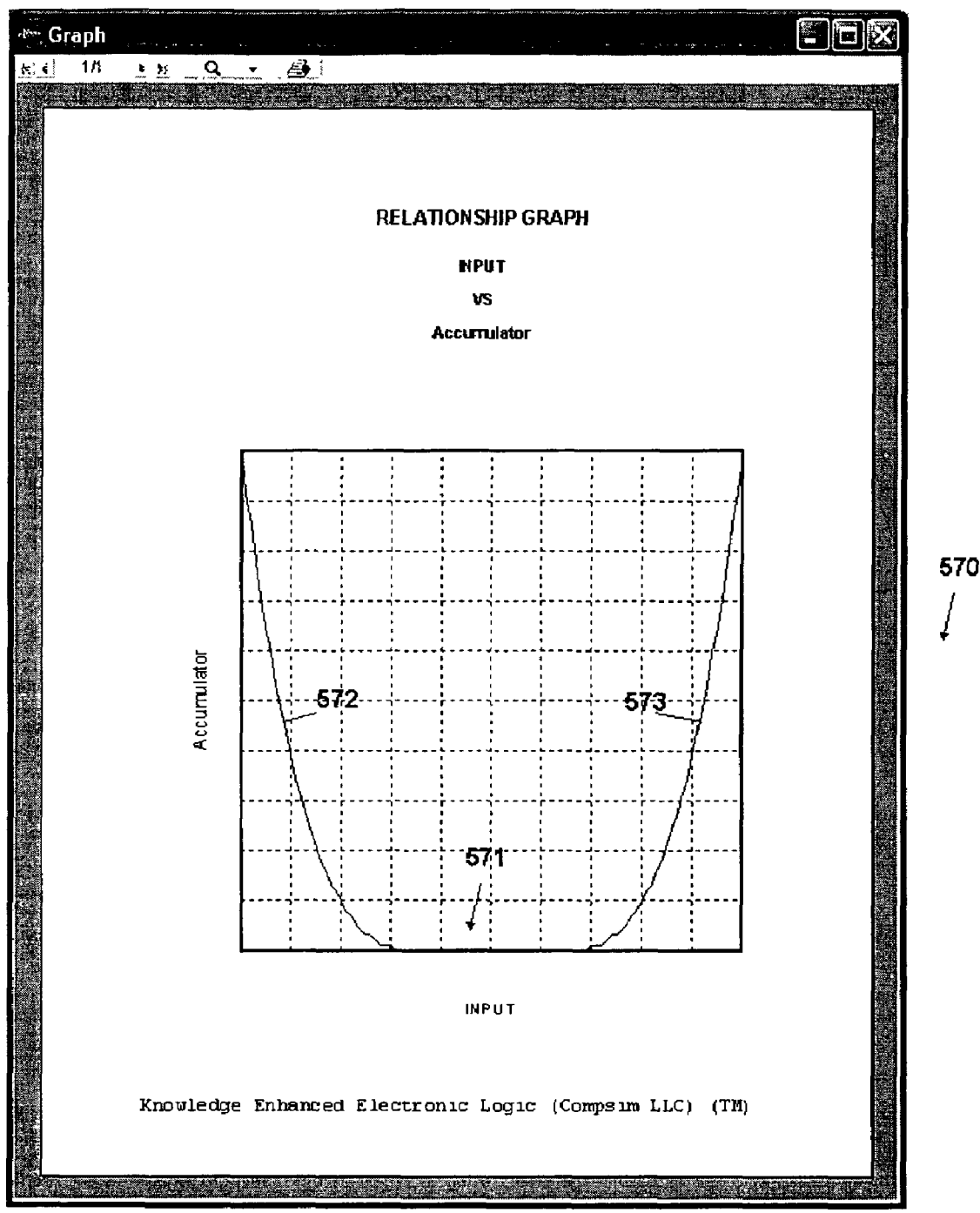
FIG. 34 provides a graph reflecting the performance of a portion of a medical diagnostic system shown in FIG. 33 and more particularly showing the output as a function of the system's input and also demonstrating the plotting function available as a feature of the present invention.

Referring now to FIG. 33, a medical diagnostic system 500 is shown which includes ten positions 501–510, twenty-one arguments 511–531 and fifteen linkages 532–546. The medical diagnostic system 500 is adapted for interpreting test data such as such as blood sugar levels. The diagnostic system 500 can be better understood with reference to FIG. 34 showing a graph 570 of the modified value of position 510 which serves as the output signal of the system as a function of an input signal applied to arguments 514 and 521 (via linkage 532). Graph 570 shows a normal range corresponding to the flat area 571 of the function extending across the middle of the graph. The results of below normal readings are shown with respect to the curve 572 on the left side of the graph 570. The results of above normal readings are shown with respect to the curve 573 on the right side of the graph 570. The abscissa value provides a measure of the importance of abnormal readings. Thus, a diagnostic reading that is outside the normal range geometrically increases in importance by the amount it departs away from the range of normal values.

The diagnostic system 500 may be viewed as having four operative sections. The curve 572 (see FIG. 34) is created by operation of positions 503–505 and related arguments and links. The curve 573 is created by operation of positions 506–509 and related arguments and links. Position 510 may be seen as accumulating curves 572 and 573 into a single continuous curve. Positions 501 and 502 provide a mechanism for controlling the width of the normal region shown as the flat area 571.

The input supplied by argument 514 drives the modified value of position 503. The clipper window 550 drives the importance of position 504 through linkage 533. Position 504 is biased by the supporting argument 515 with a value of 100, so that position 504 is fully driven from 0% to 100% and the modified value of position 504 rises from 0 to 100 counts as the modified value of position 503 rises through the range of the clipper window 550. Because position 504 is biased with a fixed supporting argument of value 100, the modified value of position 504 rises at the same rate as its overall importance. This value is transmitted through links 534, 535 and 536 to objecting arguments 517, 518 and 519 which drive position 505 along with supporting argument 516 and objecting argument 520. Supporting argument 516 is biased with a fixed value of 100. The modified value of position 505 is linked to the supporting argument 531 by linkage 537 and thereby contributes to the overall output of the system as expressed by the modified value of position 510. By way of illustration, if the input signal applied to supporting argument 514 rises to a value of 10, this would drive the modified value of position 503 to a value of 10. Since this value is 27% of the way between the clipper lower limit and the clipper upper limit, the importance of position 504 would rise to a value of 27. This will in turn drive the objecting arguments 517, 518 and 519 to values of 27 each which drives the modified value of position 505 to a value of 39. In this case the modified value of position 510 and the output of the system would be 39.

The input supplied by argument 521 drives the modified value of position 506. The clipper window 557 drives the importance of position 507. The position 507 is biased by the supporting argument 522 with a value of 100 so that position 507 is fully driven from 0% to 100% and the modified value of position 507 rises from 0 to 100 counts as the modified value of position 506 rises through the range of the clipper window 557. The modified of position 507 drives the objecting argument 524 of position 508 which is also biased by supporting argument 523 with a value of 100. This inverts the modified value of position 507 so that as the modified value position 507 goes from 0 to 100 the modified value of position 508 goes from 100 to 0. The modified value of position 508 drives objecting arguments 526, 527 and 528 through linkages 540, 541 and 542. The position 509 is also biased by the supporting argument 525 with a value of 100. The modified value of position 509 is linked to the supporting argument 530 by linkage 543 and thereby contributes to the overall output of the system as expressed by the modified value of position 510. By way of illustration, if the input signal supplied to argument 521 has a value of 20 then position 507 would have a modified value of 0 and the position 508 would have a modified value of 100. Objecting arguments 526, 527 and 528 would be driven to 100 and the modified value of position 509 would be driven to a value of 0. In this case the modified value of position 510 and the output of the system would be 0. When the input value is set to a value between the ranges of the clipper window 550 and clipper window 557, then neither lower control positions 503–505 nor upper control positions 506–509 will contribute to the output signal. However, when the input value is in the range of the clipper window 550, the lower control positions 503–505 progressively contribute to the output signal as the input signal decreases. Further, when the input value is in the range of the clipper window 557, the lower control positions 506–509 progressively contribute to the output signal as the input signal increases.

The diagnostic system 500 is adjustable. Positions 501 and 502 may be used to control the clipper upper limit of clipper window 550 and the clipper lower limit of clipper window 557. The adjustment control is applied by supporting argument 511 which controls the modified value of position 501. The modified value of position 501 controls the upper limit of clipper 550 through linkage 545. The modified value of position 501 is also used to drive the objecting argument 513 of position 502 that is biased by the supporting argument 512. This inverts the value of the modified value of position 501 which is then used to control the lower limit set point of clipper 557 through linkage 546. The points at which the curves 272 and 273 begin may be thereby changed and the extent of the normal range widened or narrowed.

The graphical programming interface 10 allows for the efficient development of effective software programs using a highly visual programming approach. However, the interface is only one part of the software system of the present invention. As positions, arguments and linkages and other graphical artifacts are configured on the interface screen programming code implementing the application being specified is automatically generated by the computer running the development system. This code is fully functional and enabled to run in the background. The code is coupled to the application programming interface and the graphical artifacts shown on the development screen so the application can be tested as it is being developed. Arguments can be manually manipulated to simulate different levels of inputs and the results can be immediately seen in turns of position values and the operation of the application can be visually demonstrated as has been shown with many of the program examples already given. After program development is complete the code can be reconfigured by dropping its connections to the graphical interface adapting it to a container so it can be ported to a different system and adding the glue logic necessary for it to coupled to inputs and outputs and run as an independent software program.

Figure 13:
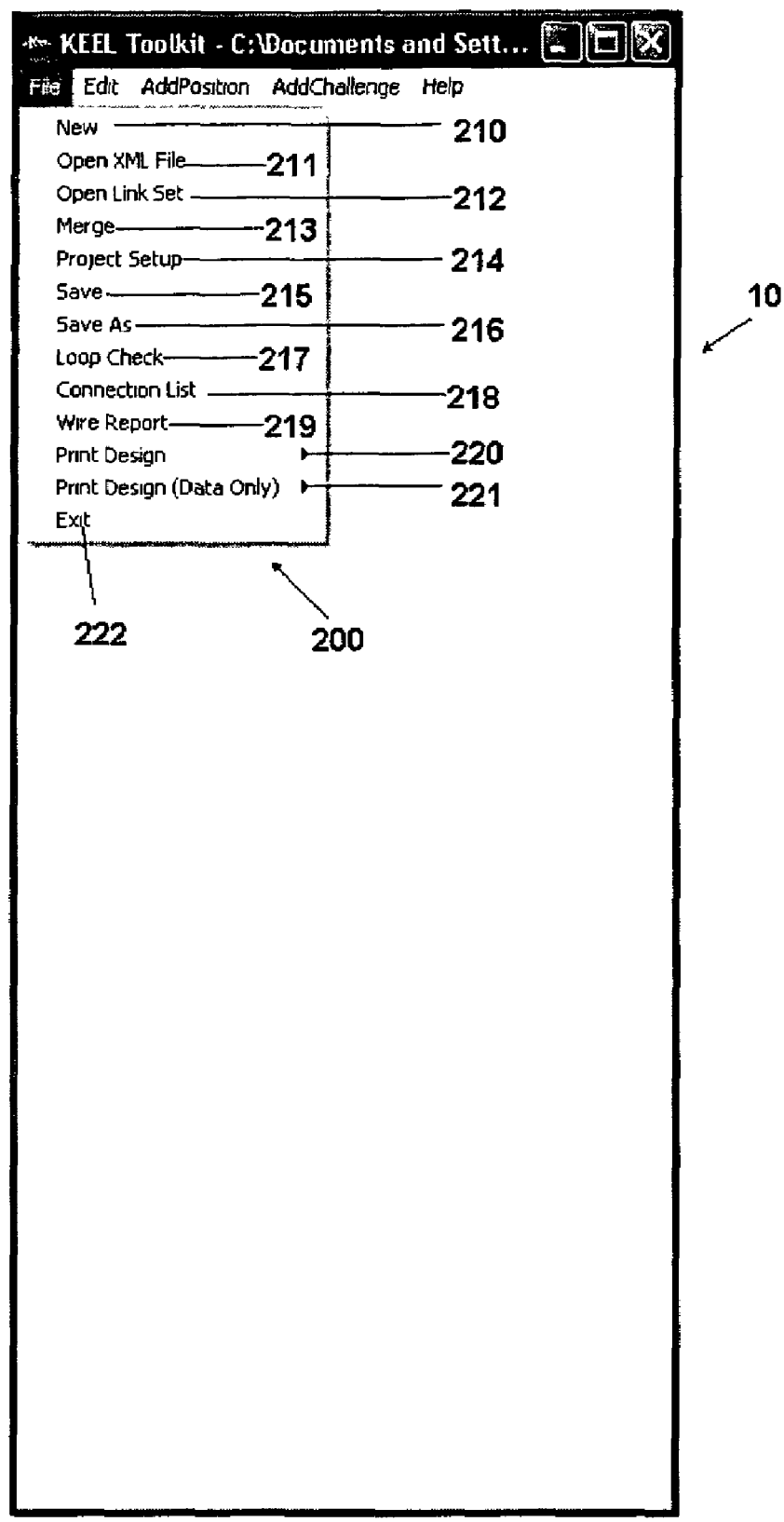
FIG. 13 provides a screen view of the main File menu for the graphical programming interface of the present invention showing the thirteen menu items available under that menu.
Figure 14:
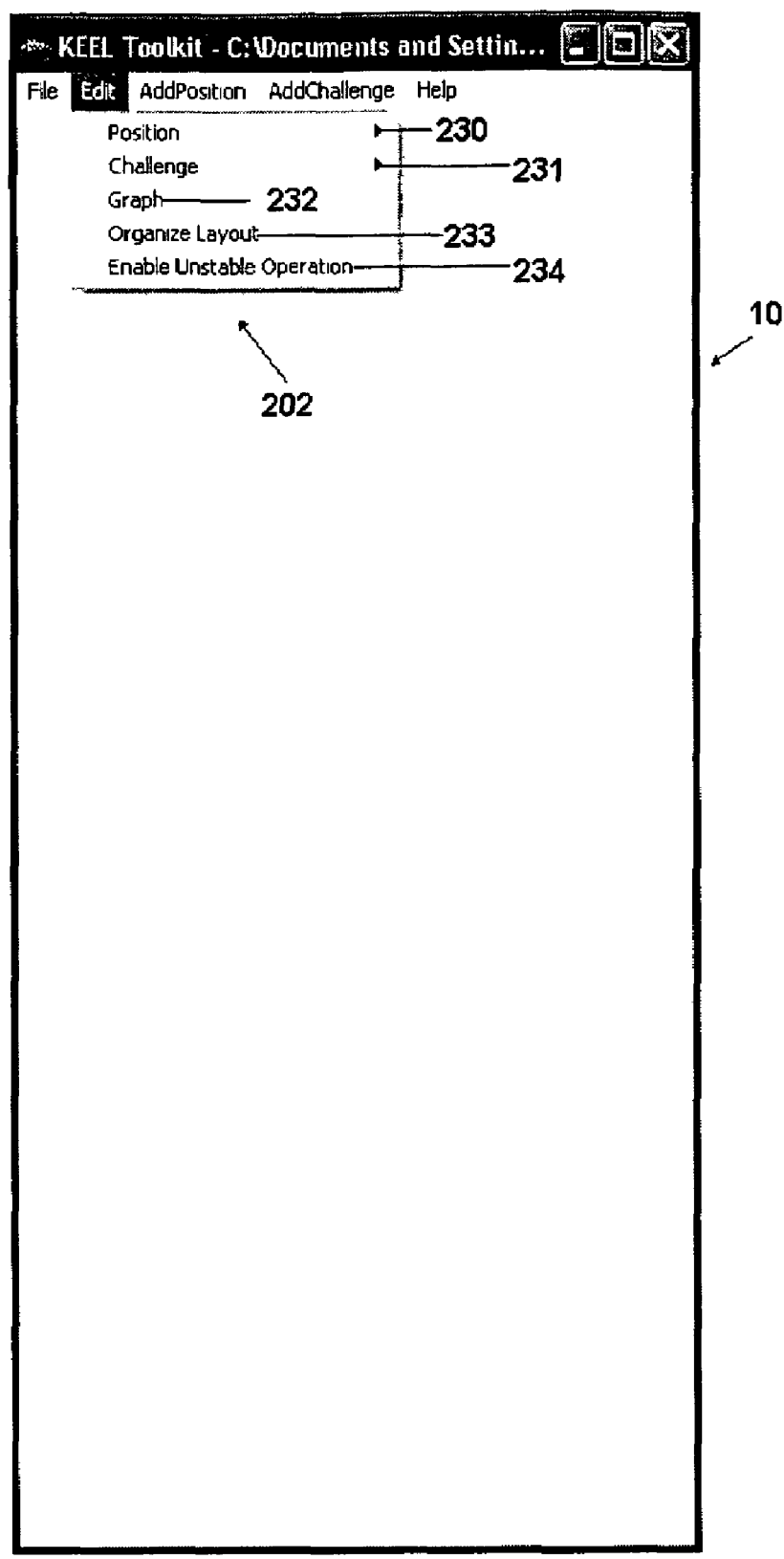
FIG. 14 provides a screen view of the main Edit menu for the graphical programming interface of the present invention showing the five menu items available under that menu.

Referring now to FIGS. 13 and 14, the File and the Edit buttons on the main development program toolbar open menus 200 and 202 which present several useful menu items any one of which may be selected by highlighting and clicking on the items with the cursor. The New item 210 allows programs to be started under a new name. The Open XML File and Open Link Set items 211 and 212 allow different types of existing program files to be opened for further work. The Merge item 213 opens a window which enables another existing program to be combined or merged with the current program at a point after a specific selected position. The Project Setup item 214 opens a window having text boxes for appending a title, author, and description to the program file. The Save and Save As items 215 and 216 perform their traditional functions in saving program files under existing or new names. The Loop Check item 217 initiates a manual check of the design loops in the current application. The Connection List item 218 invokes a function which displays and allows a Connection Chart to be printed out showing a list of positions and their respective supporting and objecting arguments for the current application under development. The Wire Report item 219 invokes a function which displays and allows a Wire Report to be printed out showing a list of categories of linkages and the specifics for such linkages existing in the current application under development. The Print Design item 220 opens a small window allowing a choice between Visual Basic and C Programming Language menu items and then according to this selection will display and allow print out of a file listing the program code for the current software application which is under development. The Print Design (Data Only) item 221 opens a small window allowing a choice between Visual Basic and C Programming Language and then according to this selection will display and allow print out of the data portion of the program code for the current software application under development. The Exit item 222 exits the development environment. The Position item 230 opens a small window allowing a choice between Adding, Editing and Deleting menu items which allow for new positions to be added or existing positions edited in accordance with the window 13 of FIG. 2 or for selected positions to be deleted. The Challenge item 231 opens a small window allowing a choice between Adding, Editing and Deleting menu items which allow for new arguments to be added or existing arguments edited in accordance with the window 53 of FIG. 3 or for a selected argument to be deleted. The Graph item 232 opens a window listing all positions on one side and all arguments on the other for the program under development. After a specific position and a specific argument are selected an execute button on the window invokes a program execution and plotting function which runs through the full range of argument values and calculates the corresponding position values and displays a graph of the position value as a function of the argument value. This graph may then be printed out by clicking on a print button associated with the display window for the position-argument graph. This plotting function enhances the ability of the program to be tested and debugged during development. The Organize Layout item 233 opens a window listing positions in the current program under development and allowing different positions to be deselected in accordance with check boxes. The deselected positions are hidden from view and are not displayed in the programming interface window which can assist in avoiding screen clutter. The Enable Unstable Operation item 234 allows the developer to override the warnings illustrated in FIG. 10 with respect to feedback and possible unstable operation of the program.

Referring now again to FIG. 34, the graph 570 also illustrates the output and operation of the plotting function which may be activated using Graph item 232 of menu 200. In this case the modified value of position 510 which serves as the output signal of the system 500 of FIG. 33 is plotted against the value of the argument 511 which serves as the input to the system. After the execute button is engaged the program runs through the full range of argument values and calculates the corresponding position values and displays the graph 570 of the position value as a function of the argument value. This graph 570 may then be printed out by clicking on a print button associated with the display window for the position-argument graph to provide the graphical result shown in the figure.

Figure 15:
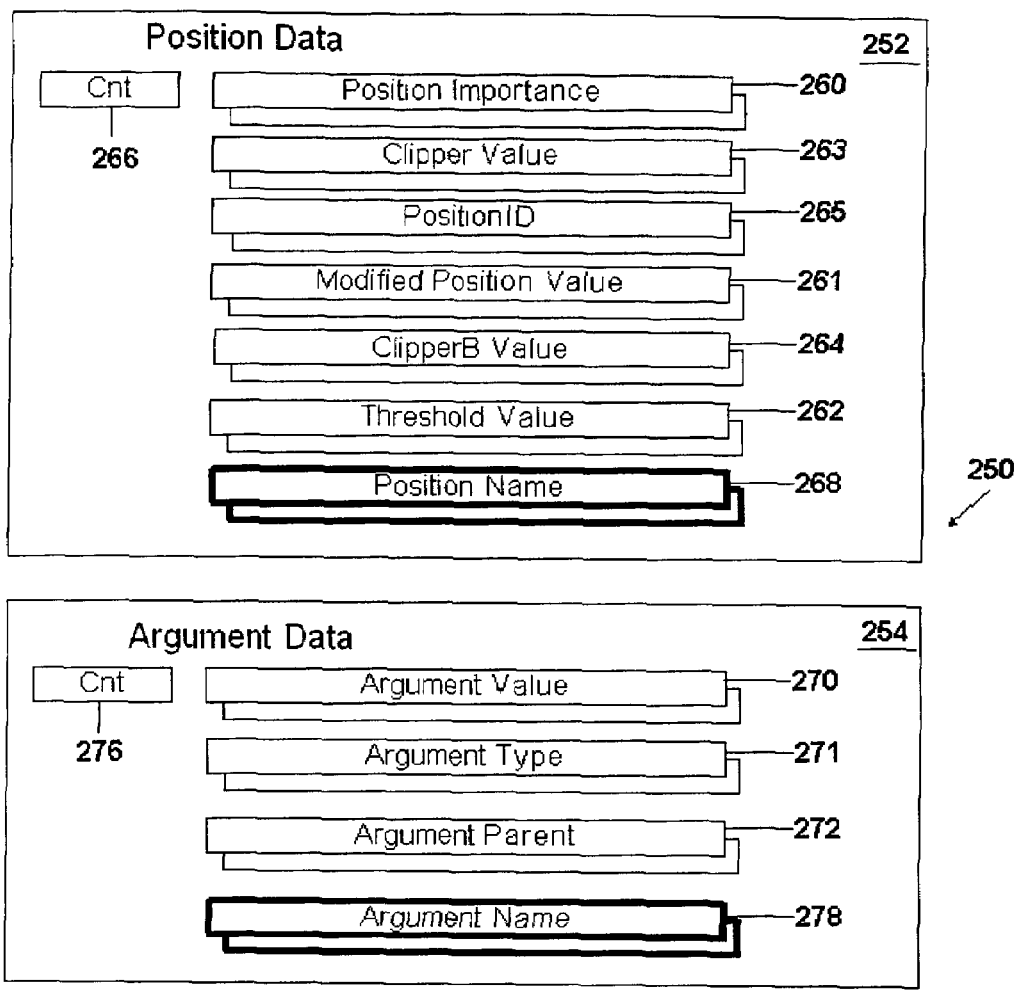
FIG. 15 provides a diagrammatic illustration of the data structure and data tables for the position and argument related data in accordance with the computer programs of the present invention.

Referring now to FIG. 15, the data memory structures 250 underlying the positions and arguments forming the basic tree structure part of the software programs which may be developed using the programming interface 10 are shown. Position data table 252 specifies seven data arrays 260–265 and 268 containing data relating to each position as developed and specified on screen with the programming interface. Argument data table 254 specifies four data arrays 270–272 and 278 containing data relating to each argument as developed and specified on screen with the programming interface. The arrays 260, 261, 262, 263, 264 and 265 represent one dimensional arrays that contain data elements relating to position importance (Position Importance), modified position value (Modified Position Value), threshold set point (Threshold Value), clipper upper limit set point (Clipper Value), clipper lower limit set point (ClipperB Value), and position ID, respectively. The count array 266 tracks the number of positions in a program. The count values index all of the data elements and identify them with the positions to which they belong. The data elements for position importance, modified position value, threshold set point, clipper upper limit set point, clipper lower limit set point have the functions and characteristics previously described. The position ID data array 265 provides convenient entries by which arguments can be efficiently linked to the different positions with which they are associated. The position name data array 268 stores the name given each position for display on screen as part of the programming interface. The arrays 270, 271 and 272 represent one-dimensional arrays that contain data elements relating to argument value, argument type (supporting or objecting) and the argument parent (its parent position), respectively. The count array 276 tracks the number of arguments in a program and indexes all of the data elements to the argument to which they belong. The data elements for argument value and argument type have the functions and characteristics previously described. The argument parent array 272 provides convenient entries of the Position IDs of the positions which the arguments are associated with by which the arguments can be efficiently linked with their positions. The argument name data array 278 stores the name given each argument for display on the screen as part of the programming interface.

Figure 16:
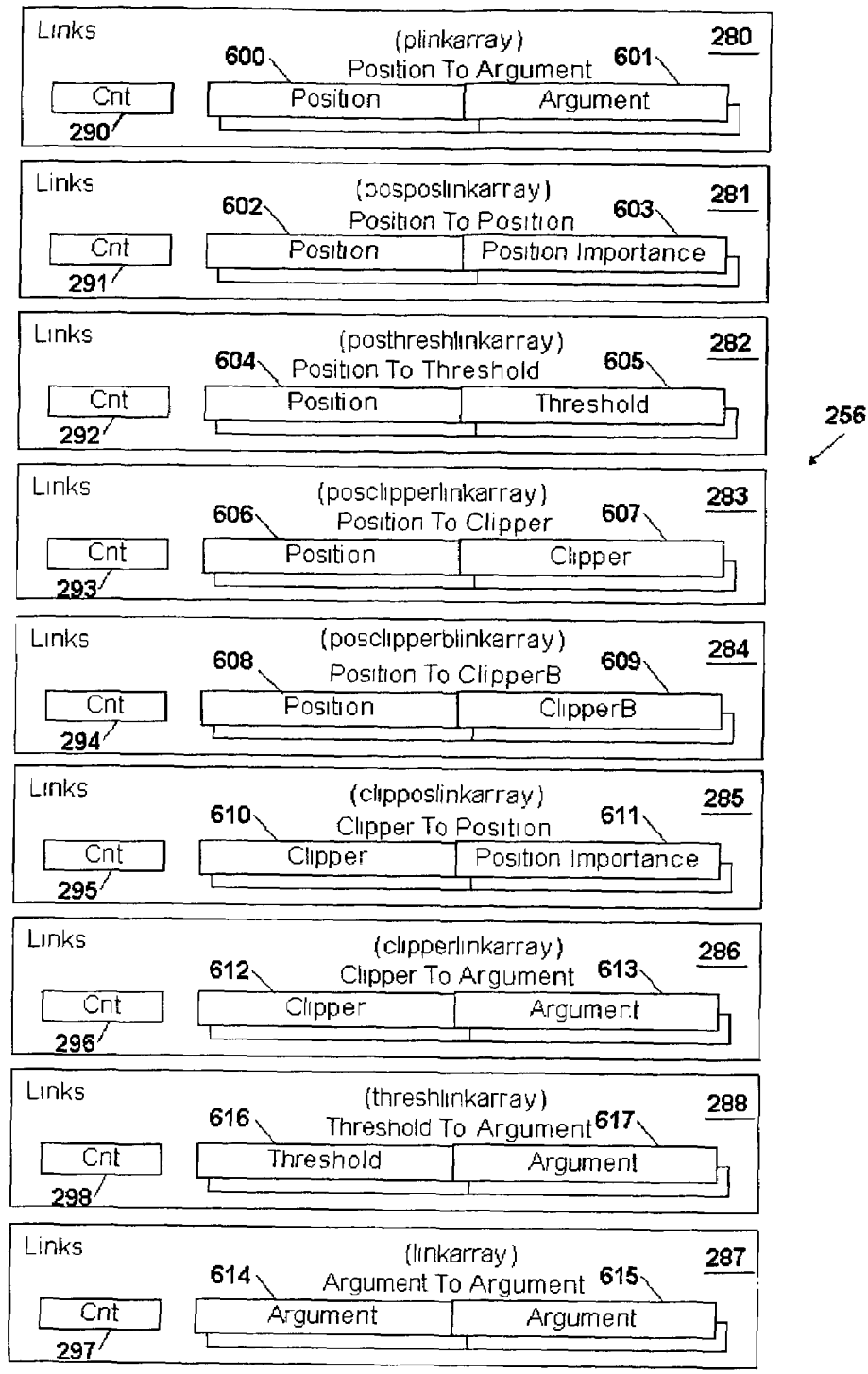
FIG. 16 provides a diagrammatic illustration of the data structure and data arrays for linkage related data in accordance with the computer programs of the present invention.

Referring now to FIG. 16, the data memory structures 256 underlying the connections or linkages part of the software programs that may be developed using the programming interface 10 are shown. The data arrays 280–288 represent two-dimensional arrays that contain source and destination data elements 600–617 specifying the source and destination positions and arguments related to the connection points for the linkages. Data array 280 contains modified position to argument connection data. Data array 281 contains modified position to position importance connection data. Data array 282 contains modified position to threshold (set point) connection data. Data array 283 contains modified position to clipper upper limit (set point) connection data. Data array 284 contains modified position to clipper lower limit (set point) connection data. Data array 285 contains clipper window to position importance connection data. Data array 286 contains clipper window to argument connection data. Data array 287 contains argument to argument connection data. Data array 288 contains threshold to argument connection data. As previously shown the linkages can be used to form a linkage system or web which defines and enables complex functionality in conjunction with the tree structure of positions and arguments.

Figure 17:
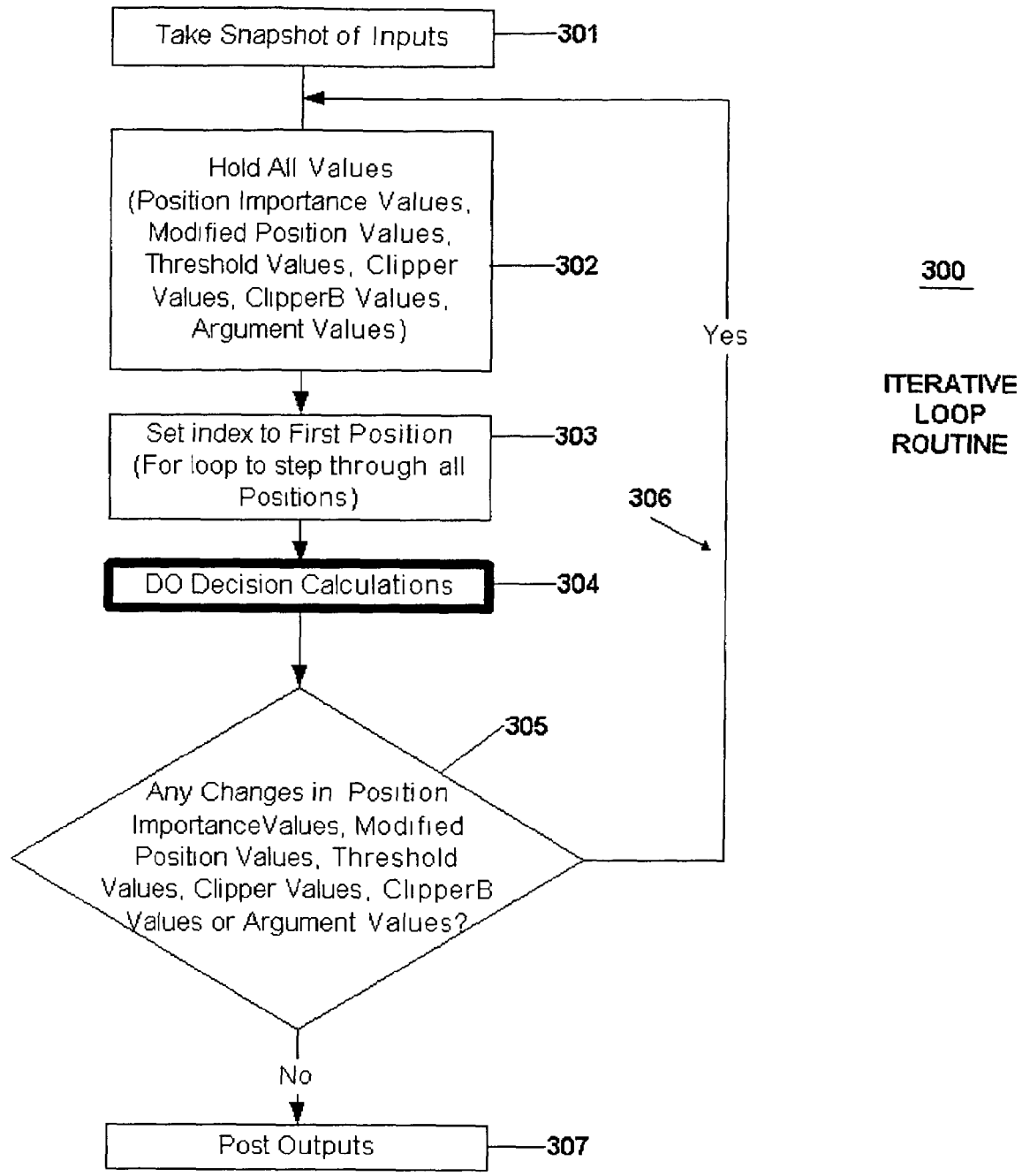
FIG. 17 provides a flowchart showing the Iterative Loop Routine by which the software program of the present invention iterates to find a solution for all importance values, modified position values, threshold set points, clipper upper and lower limit set points and argument values.

Referring now to FIG. 17, the flowchart 300 shows the main Iterative Loop Routine of the execution engine by which the software program of the present invention settles on solutions for all importance (position) values, modified position values, threshold set points, clipper upper and lower limit set points and argument values. In step 301 new values for all outside inputs to the arguments are accepted. In step 302 all importance (position) values, modified position values, threshold set points, clipper upper and lower limit set points and argument values are saved to memory. In step 303 the index for the main program loop 306 is set to point to the first position. In step 304 the program enters the Do Decision Routine 310 (FIG. 18) which thereafter leads to the calculation routines representing the primary data processing elements of the program. When the Do Decisions Routine 310 is completed the program returns to decision step 305 in which it compares all newly calculated importance (position) values, modified position values, threshold set points, clipper upper and lower limit set points and argument values to the importance (position) values, modified position values, threshold set points, clipper upper and lower limit set points and argument values previously saved to memory in step 302. If there are any differences the program returns back along loop 306 to step 302 and restarts all calculations for the importance (position) values, modified position values, threshold set points, clipper upper and lower limit set points and argument values. The execution engine continues calculating and recalculating these basic values in order to converge on stable values for which no further changes are detected in step 305 in which event the program moves to step 307 and the final outputs are posted for all values and set points.

Figure 18:
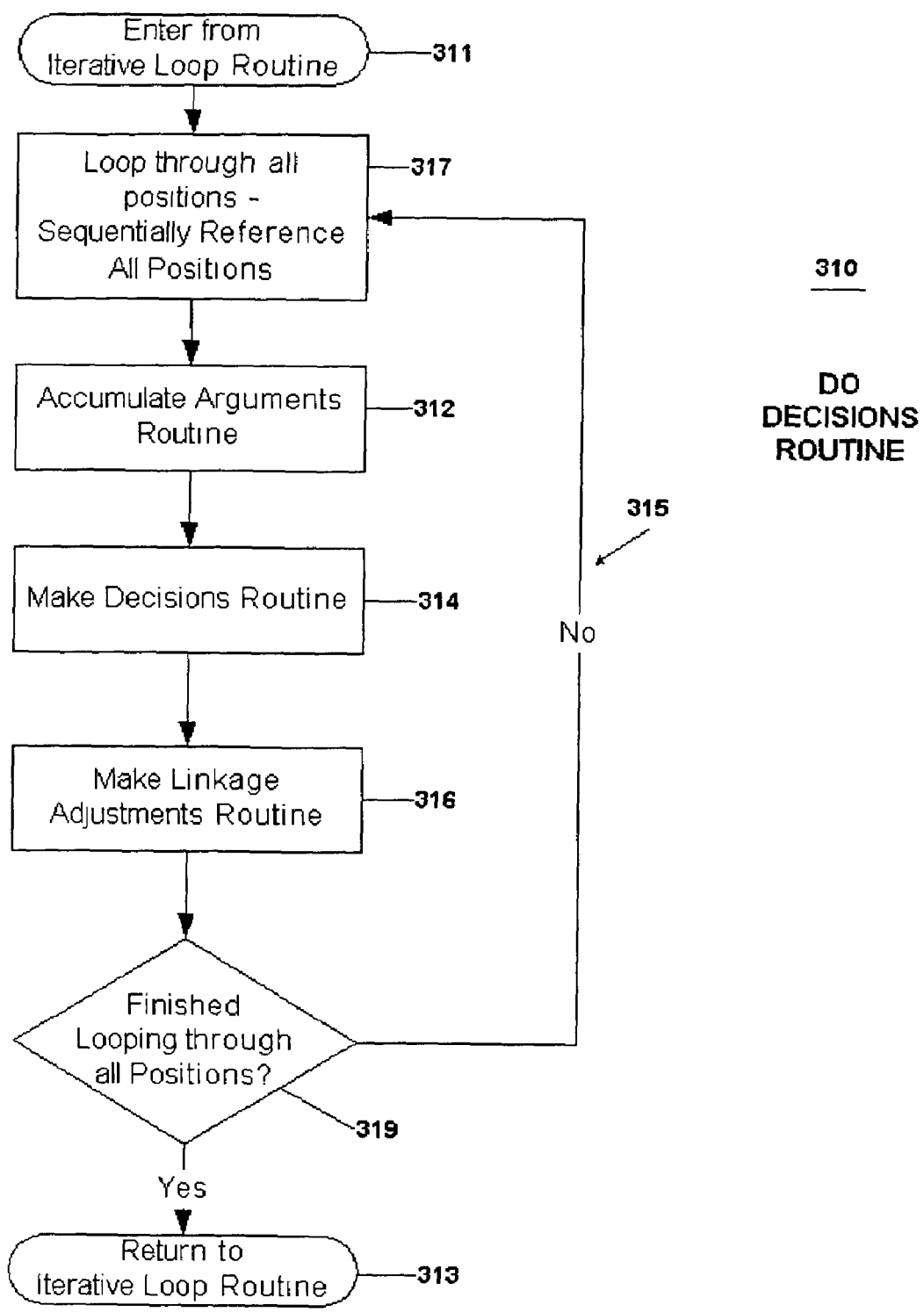
FIG. 18 provides a flowchart for the Do Decisions Routine which includes three major routines for accumulating arguments, making decisions and adjusting for linkages.

Referring now to FIG. 18, the Do Decisions Routine 310 is entered from the Iterative Loop Routine at step 311, returns to the Iterative Loop Routine at step 313 and includes three major subroutines 312, 314 and 316 for accumulating arguments, making decisions and adjusting for linkages. These subroutines are encompassed by a large loop 315 which begins at step 317 and ends at decision step 319. The loop 315 runs through all positions by sequentially indexing to each position so that the subroutines 312, 314 and 316 are run for all positions present on the graphical interface and in the program.

Figure 19:
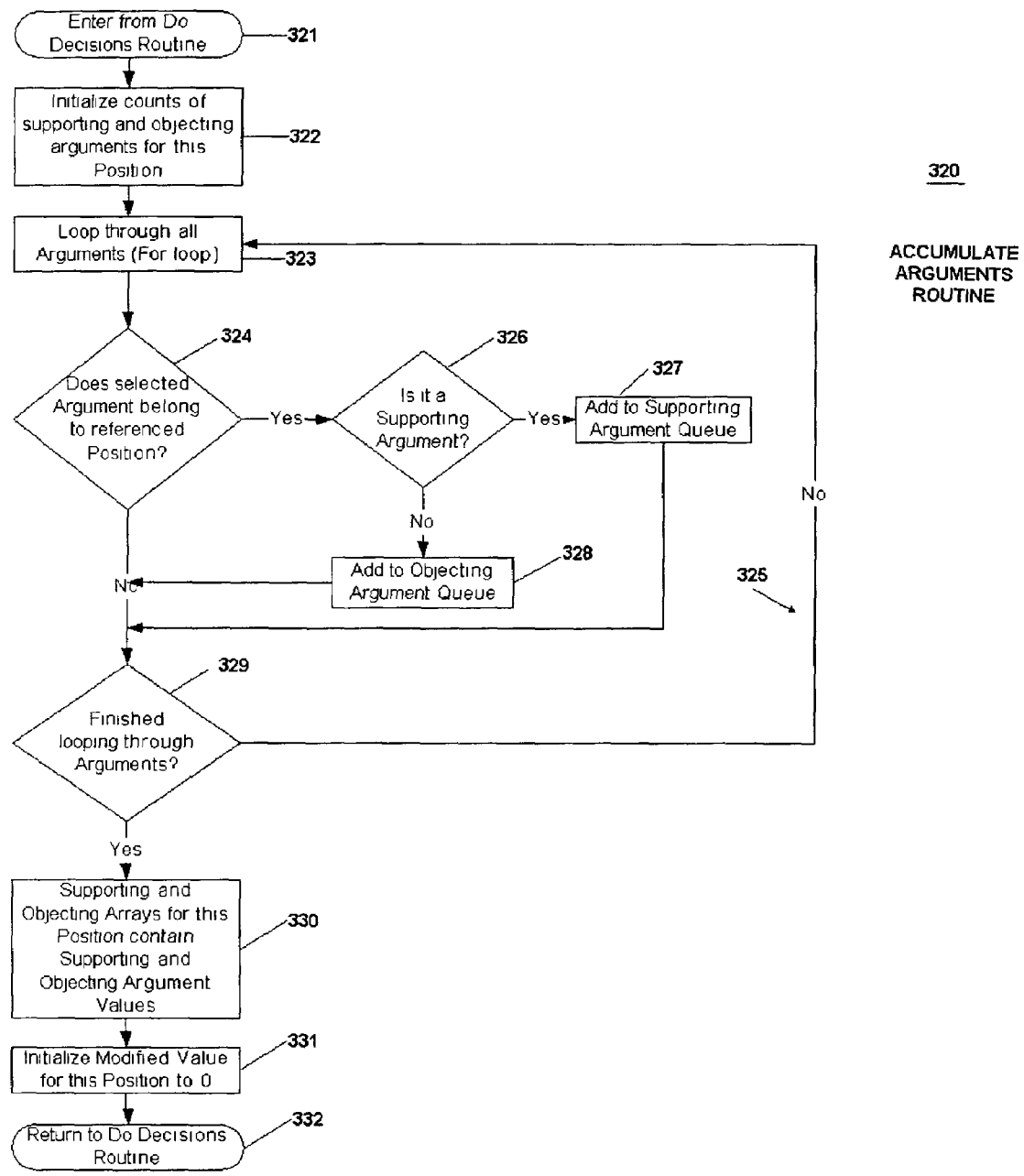
FIG. 19 provides a flowchart for the Accumulate Arguments Routine which includes a loop for sorting through all the arguments, identifying the arguments for the selected position and building a queue of supporting and a queue of objecting arguments which apply to that position.

Referring now to FIG. 19, the Accumulate Arguments Routine 320 is entered from the Do Decisions Routine 310 at step 321, returns to the Do Decisions Routine at step 332 and includes a loop 325 for sorting through all the arguments, identifying the arguments belonging to the selected position (see step 317 in FIG. 18) and building a queue of supporting and a queue of objecting arguments which apply to that position. Supporting and objecting argument counts are initialized in step 322 and the loop 325 is entered at step 323. At decision step 324 arguments belonging to the selected position are identified and when identified control is passed to decision step 326. In decision step 326 the arguments are parsed according to whether they are supporting or objecting arguments. If they are supporting arguments the routine passes to step 327 where a queue of supporting arguments is built. If they are objecting arguments the routine passes to step 328 where a queue of objecting arguments is built. In the event the argument is not identified as for the selected position in step 324 or after processing in steps 327 and 328, decision step 329 for loop 325 is entered. If the last argument has been processed by the loop 325, the routine passes to step 330. In the event the last argument has not been processed the routine returns to step 323 where the next argument is selected. In step 330 the values of the supporting and objecting arguments in the queues are collected and thereafter the modified position value is initialized to zero in accordance with step 331 in preparation for the Make Decisions Routine.

Figure 20:
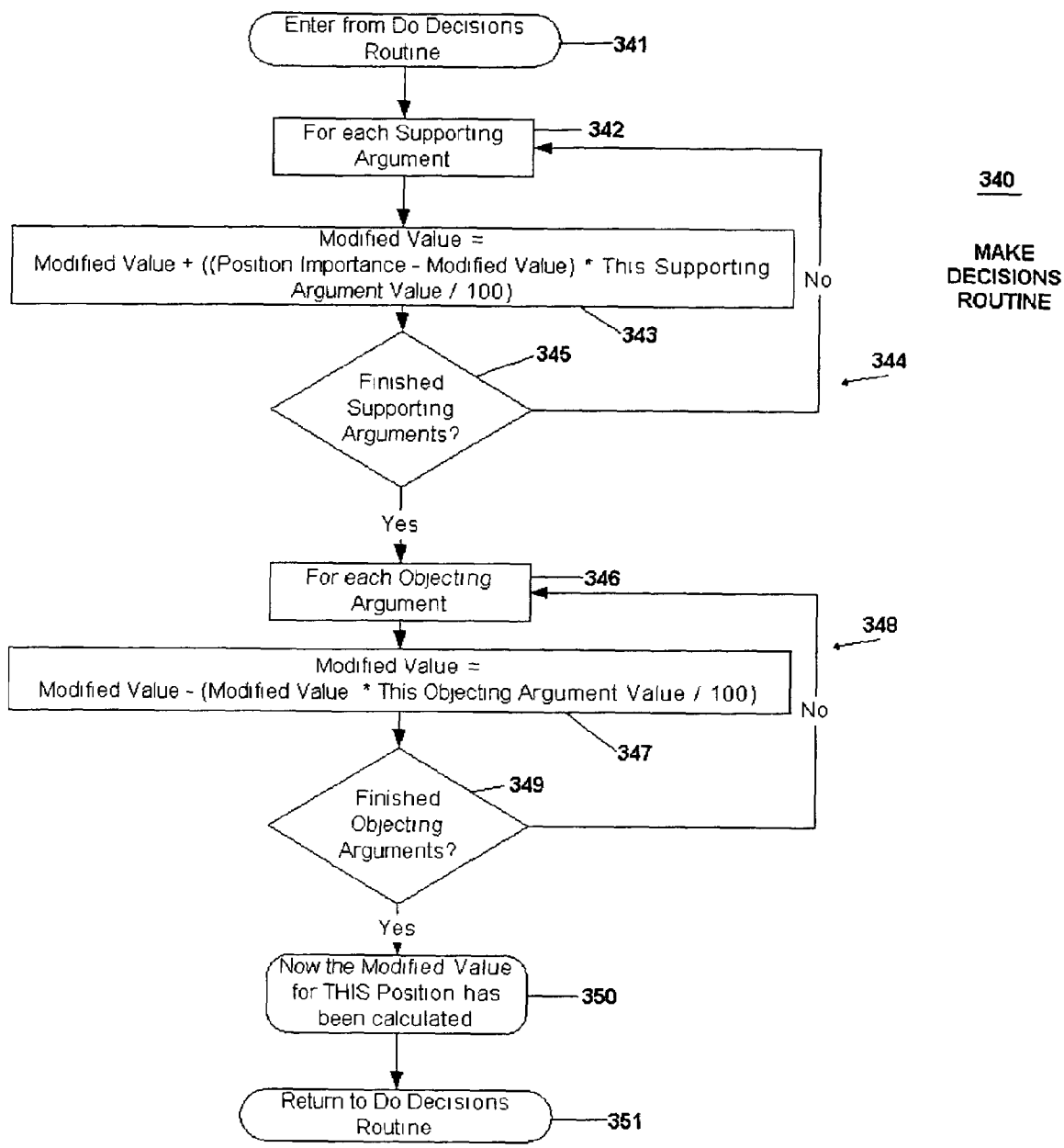
FIG. 20 provides a flowchart for the Make Decisions Routine which includes a supporting argument evaluation loop and an objecting argument evaluation loop.

Referring now to FIG. 20, the Make Decisions Routine 340 is entered from the Do Decisions Routine 310 at step 341, returns to the Do Decisions Routine at step 351 and includes a supporting argument evaluation loop 344 and an objecting argument evaluation loop 348. In loop 344 each supporting argument is sequentially referenced in step 342 and the modified position value is successively recalculated in accordance with the formula of step 343. At decision step 345 the routine passes to the objecting argument evaluation loop 348 if all supporting arguments have been processed or otherwise returns to step 342 to select and process another supporting argument. In accordance with the loop 348 each objecting argument is sequentially referenced in step 346 and the modified position value is successively recalculated accordance with the formula of step 347. At decision step 349 the routine passes to step 350 if all supporting arguments have been processed or otherwise returns to step 346 to select and process another objecting argument. In step 350 the program confirms that a final position modified value output has been calculated and saves this value to memory.

Figure 21:
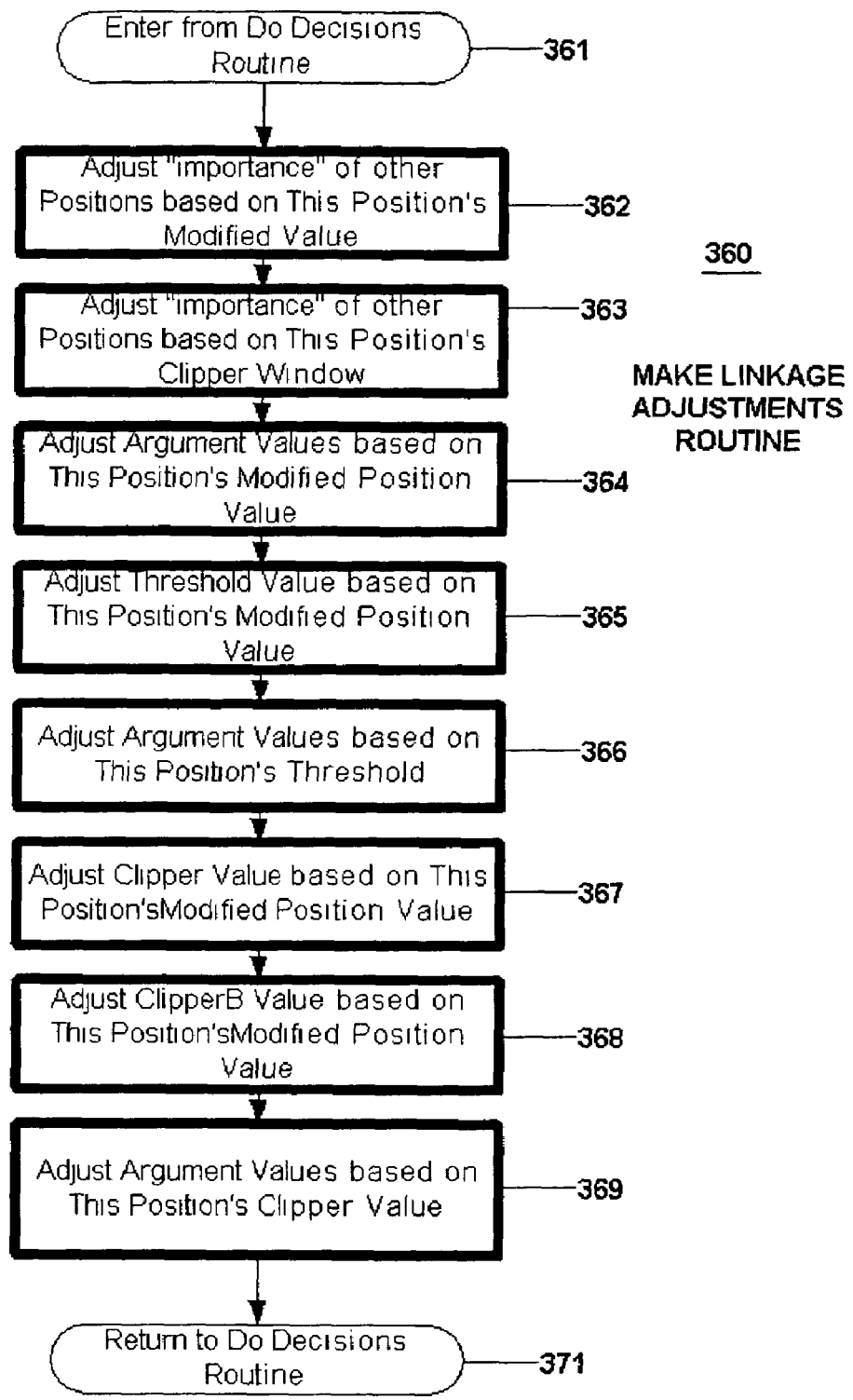
FIG. 21 provides a flowchart for the Make Linkage Adjustments Routine which includes a series of eight code segments for adjusting various position, argument, threshold and clipper values in accordance with the various linkages specified in the application program and the new modified value of the selected position as calculated in the Make Decisions Routine.

Referring now to FIG. 21, the Make Linkage Adjustments Routine 360 is entered from the Do Decisions Routine 310 at step 361, returns to the Do Decisions Routine at step 371 and includes a series of eight steps 362–369 corresponding to eight code segments for adjusting various position, argument, threshold and clipper values in accordance with the various linkages specified in the application program and the new modified value (see step 350 in FIG. 20) for the selected position (see step 317 in FIG. 18) as previously calculated in the Make Decisions Routine. The code segments 362–369 reflect the different kinds of linkages which may be included in application programs in accordance with the application programming interface 10.

Figure 22:
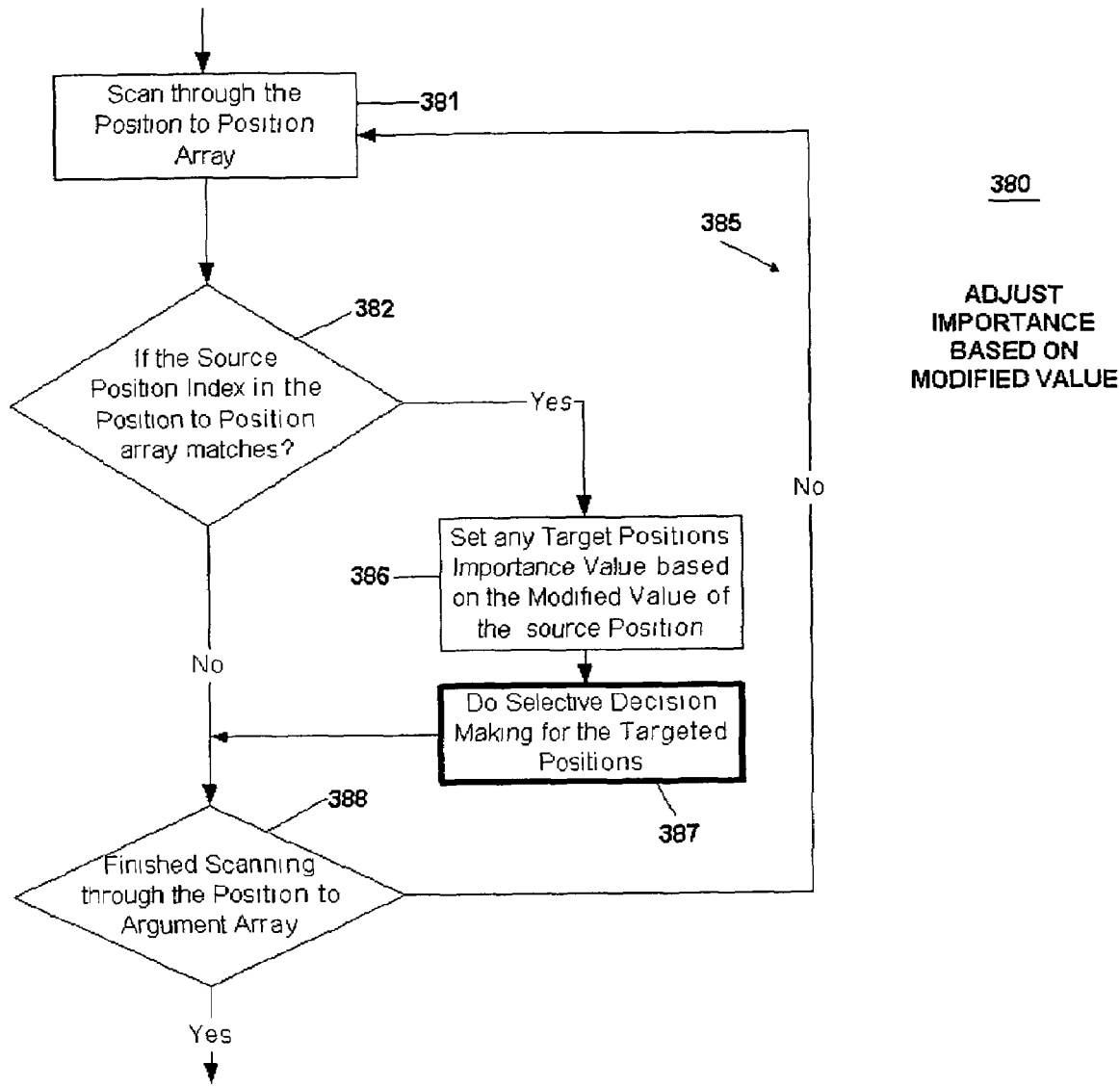
FIG. 22 provides a flowchart for the Adjust Importance Based On Modified Value Code Segment which is entered from the Make Linkage Adjustments Routine and includes a loop for sequentially running through or scanning the position (modified value) to position importance array and finding the positions affected by any changes in the modified value of the selected position and resetting the position importance of those positions.

Referring now to FIG. 22, the Adjust Importance Based On Modified Value Code Segment 380 is entered from the Make Linkage Adjustments Routine 360 at step 381, moves to the next code segment shown in the Make Linkage Adjustments Routine at step 363 from step 388 and includes a loop 385 for sequentially running through or scanning the position (modified value) to position importance array 281 (FIG. 16) and finding the positions affected by any changes in the modified value of the selected position and resetting the position importance of those positions. In decision step 382 the program checks for matches between source position entries in the array 281 and the index of the currently selected position. When a match is found the program moves to step 386 and resets the position importance of the affected position and at step 387 enters the Do Selective Decision Making routine which will be described later. In the event no match is found in step 382 or after the Do Selective Decision Making Routine is completed in step 387 the program passes to decision step 388 at which a check is made to determine if the entire position to position importance array has been scanned. If more entries remain to be scanned the program returns to step 381 and a new entry is identified, or if all entries have been scanned the program passes to the next code segment.

Figure 23:
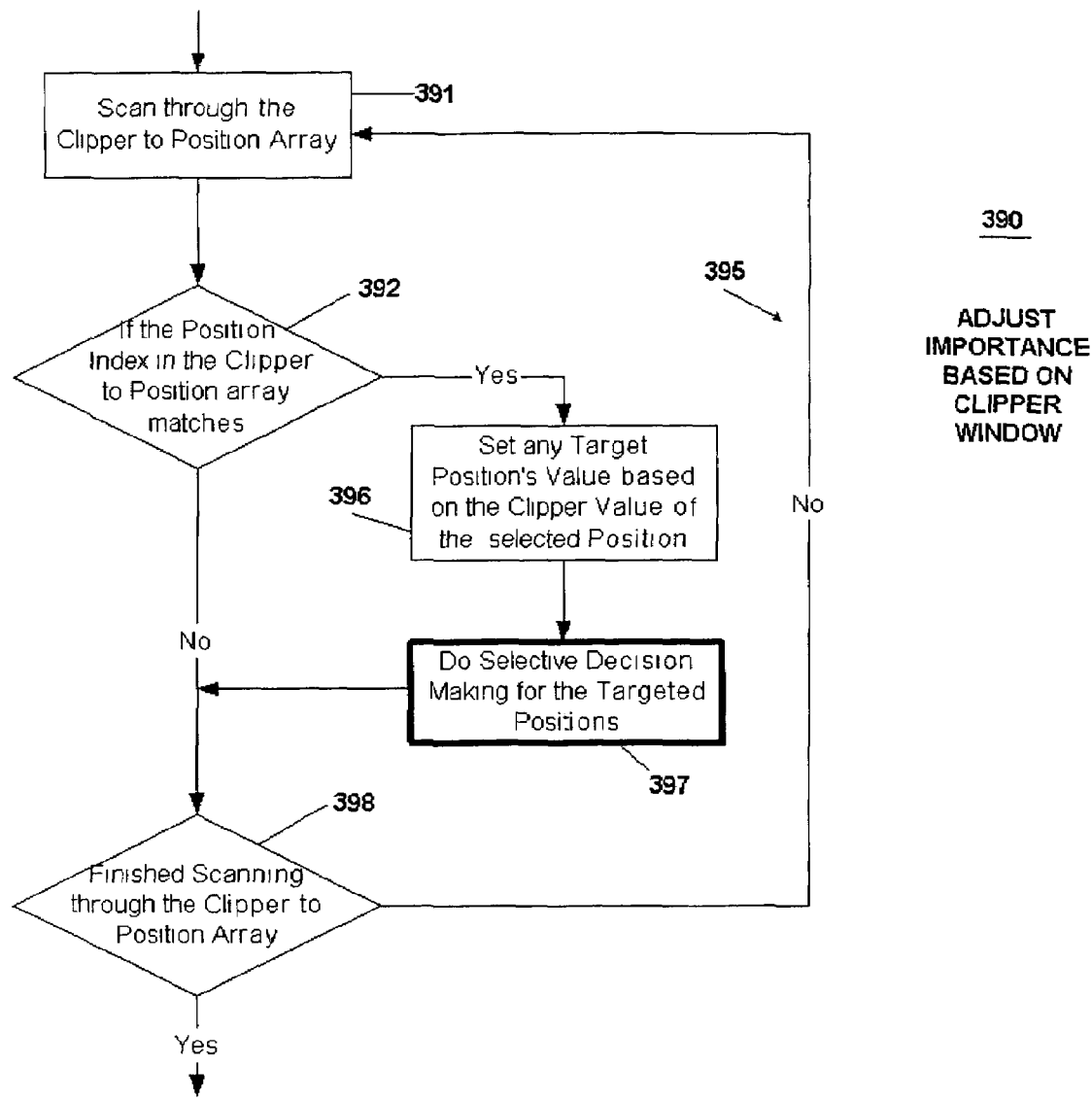
FIG. 23 provides a flowchart for the Adjust Importance Based On Clipper Window Code Segment which is entered from the Adjust Importance Based On Modified Value Code Segment and includes a loop for sequentially running through or scanning the clipper to position importance array and finding the positions affected by any changes in the clipper window value of the selected position and resetting the position importance of those positions.

Referring now to FIG. 23, the Adjust Importance Based On Clipper Window Code Segment 390 is entered from the Adjust Importance Based On Modified Value Code Segment 380 at step 391, moves to the next code segment shown in the Make Linkage Adjustments Routine at step 364 from step 398 and includes a loop 395 for sequentially running through or scanning the clipper to position importance array 285 (FIG. 16) and finding the positions affected by any changes in the clipper window value of the selected position and resetting the position importance of those positions. In decision step 392 the program checks for matches between source position entries in the array 285 and the index of the currently selected position. When a match is found the program moves to step 396 and resets the position importance of the affected position and at step 397 enters the Do Selective Decision Making routine which will be described later. In the event no match is found in step 392 or after the Do Selective Decision Making Routine is completed in step 397 the program passes to decision step 398 at which a check is made to determine if the entire position to position importance array has been scanned. If more entries remain to be scanned the program returns to step 391 and a new entry is identified, or if all entries have been scanned the program passes to the next code segment.

Figure 24:
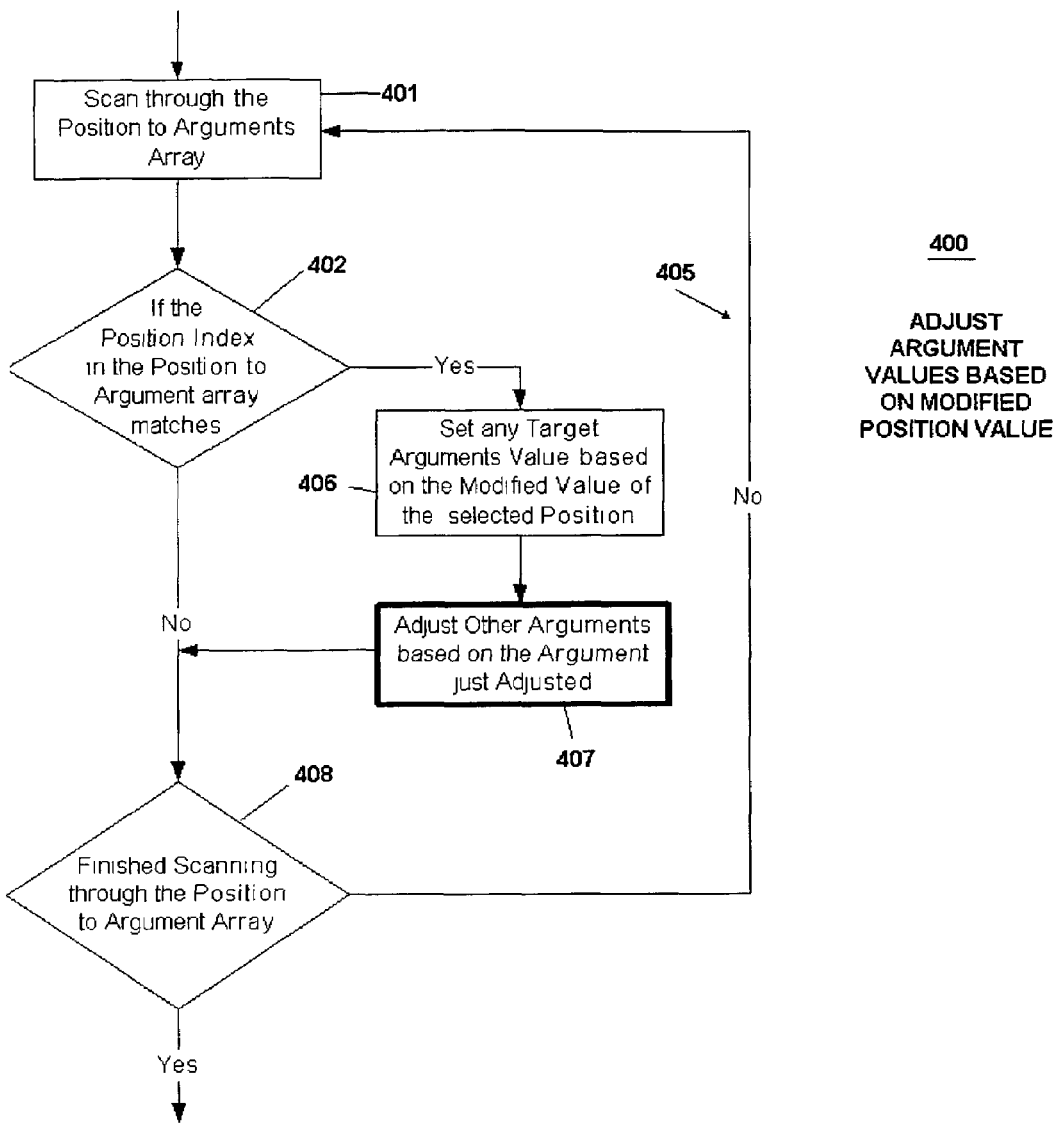
FIG. 24 provides a flowchart for the Adjust Argument Values Based On Modified Position Value Code Segment which is entered from the Adjust Importance Based On Clipper Window Code Segment and includes a loop for sequentially running through or scanning the position (modified value) to argument array and finding the arguments affected by any changes in the modified position value of the selected position and resetting those argument values FIG. 25 provides a flowchart for the Adjust Threshold Based On Modified Position Value Code Segment which is entered from the Adjust Argument Values Based On Modified Position Value Code Segment and includes two nested loops and for sequentially running through all positions and for each position sequentially running through or scanning the position (modified value) to threshold array and finding the thresholds affected by any changes in the modified position values and resetting those thresholds.

Referring now to FIG. 24, the Adjust Argument Values Based On Modified Position Value Code Segment 400 is entered from the Adjust Importance Based On Clipper Window Code Segment 390 at step 401, moves to the next code segment shown in the Make Linkage Adjustments Routine at step 365 from step 408 and includes a loop 405 for sequentially running through or scanning the position (modified value) to argument array 280 (FIG. 16) and finding the arguments affected by any changes in the modified position value of the selected position and resetting those argument values. In decision step 402 the program checks for matches between source position entries in the array 280 and the index of the currently selected position. When a match is found the program moves to step 406 and resets the value of the affected argument and at step 407 enters the Adjust Arguments Routine which will be described later. In the event no match is found in step 402 or after the Adjust Arguments Routine is completed in step 407 the program passes to decision step 408 at which a check is made to determine if the entire position to argument array has been scanned. If more entries remain to be scanned the program returns to step 401 and a new entry is identified, or if all entries have been scanned the program passes to the next code segment.

Figure 25:
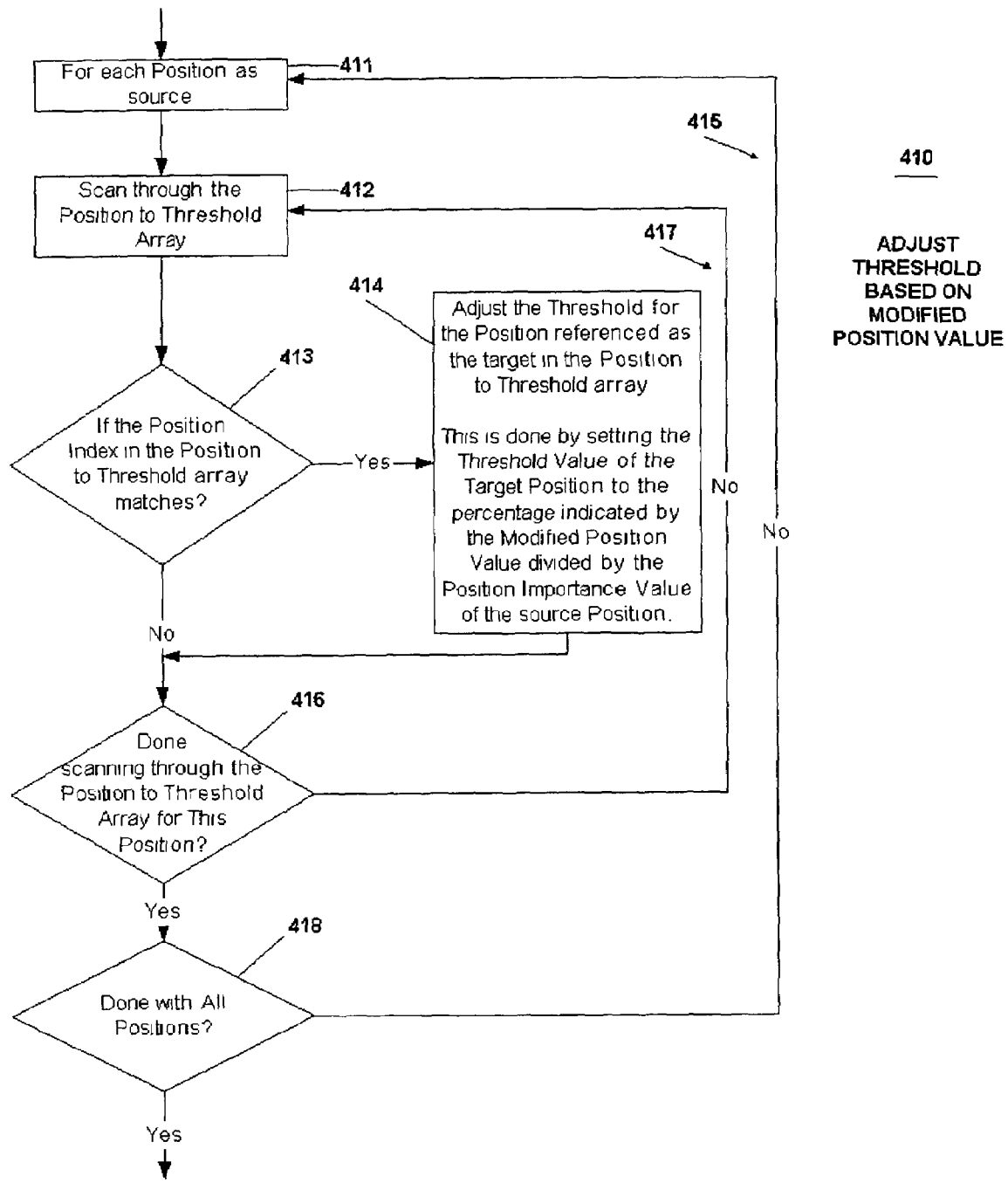

Referring now to FIG. 25, the Adjust Threshold Based On Modified Position Value Code Segment 410 is entered from the Adjust Argument Values Based On Modified Position Value Code Segment 400 at step 411, moves to the next code segment shown in the Make Linkage Adjustments Routine at step 366 from step 418 and includes two nested loops 415 and 417 for sequentially running through all positions and for each position sequentially running through or scanning the (modified) position to threshold array 282 (FIG. 16) and finding the thresholds affected by any changes in the modified position values and resetting those thresholds. In step 411 the program counts through all the positions as a function of the loop 415. In step 412 the program counts through all entries in the position to threshold array and checks for matches between the source position entries in the array 282 and the index of the position currently selected in accordance with the loop 415. When a match is found in decision step 413, the program moves to step 414 and resets and recalculates the value of the threshold set point as a function of the percentage defined by the source modified value over its position importance (full position value). In the event no match is found in step 413 or after the step 414 is completed the program passes to decision step 416 at which a check is made to determine if the entire position to threshold array has been scanned. If more entries remain to be scanned in loop 417, the program returns to step 412 and a new entry is identified or if all entries have been scanned the program passes to step 418 at which a check is made to determine if all the positions have been processed by loop 415. If more positions remain to be processed the program returns to step 411 and a new position entry is identified, or if all entries have been scanned in loop 415 the program passes to the next code segment.

Figure 26:
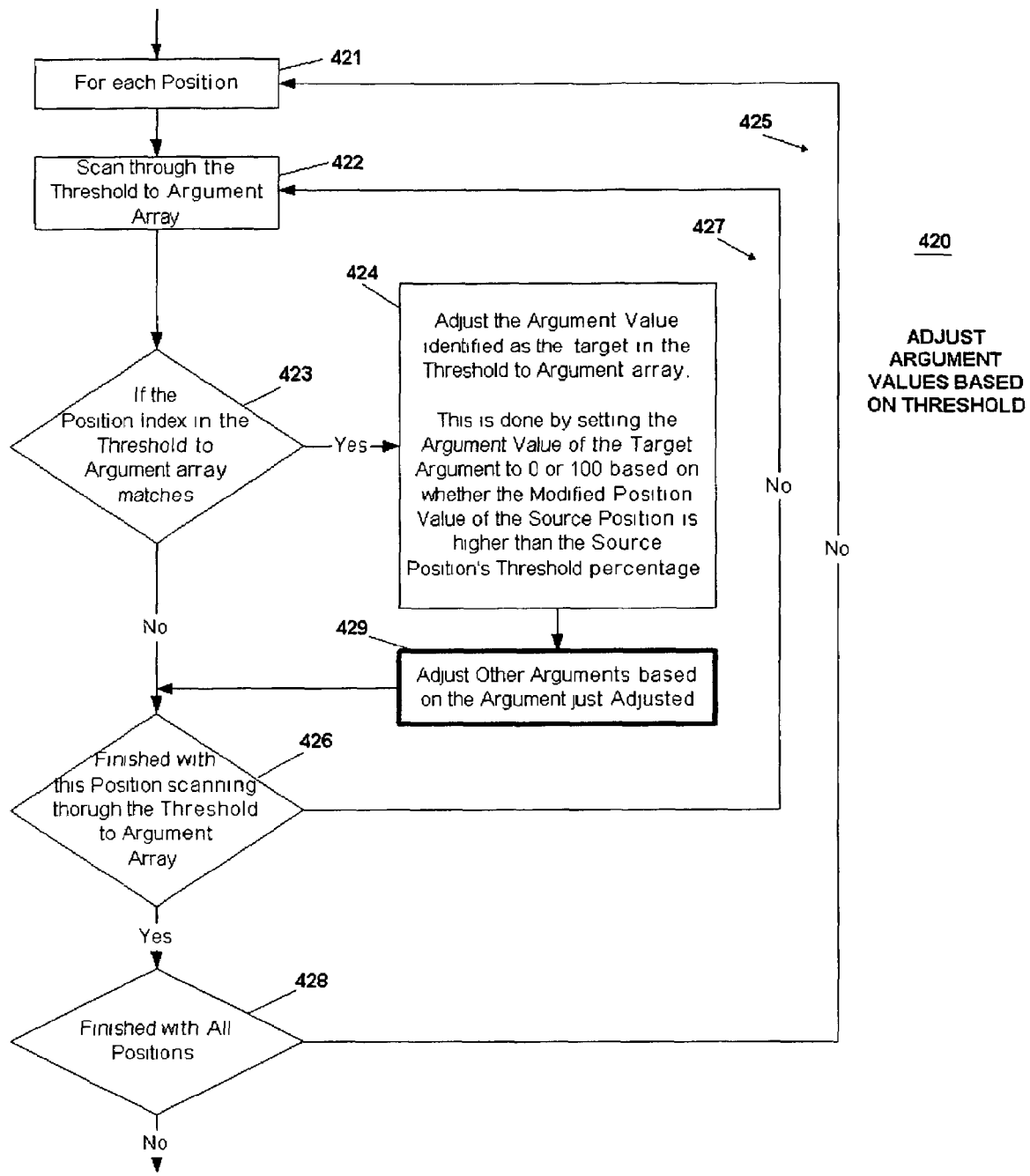
FIG. 26 provides a flowchart for the Adjust Argument Values Based On Threshold Code Segment which is entered from the Adjust Threshold Based On Modified Position Value Code Segment and includes two nested loops for sequentially running through all positions and for each position sequentially running through or scanning the threshold to argument array and finding the arguments affected by any changes in the thresholds and resetting those arguments.

Referring now to FIG. 26, the Adjust Argument Values Based On Threshold Code Segment 420 is entered from the Adjust Threshold Based On Modified Position Value Code Segment 410 at step 421, moves to the next code segment shown in the Make Linkage Adjustments Routine at step 367 from step 428 and includes two nested loops 425 and 427 for sequentially running through all positions and for each position sequentially running through or scanning the threshold to argument array 288 (FIG. 16) and finding the arguments affected by any changes in the thresholds and resetting those arguments. In step 421 the program counts through all the positions as a function of the loop 425. In step 422 the program counts through all entries in the threshold to argument array and checks for matches between the source position entries in the array 288 and the index of the position currently selected in accordance with the loop 425. When a match is found in decision step 423, the program moves to step 424 and resets the argument value to 0 or 100 as a function of whether the modified value of the source position equals or exceeds the threshold set point. After resetting the argument value in step 424 the program passes to step 429 and runs the Adjusts Other Arguments Routine which will be described later. In the event no match is found in step 423 or after the steps 424 and 429 are completed the program passes to decision step 426 at which a check is made to determine if the entire threshold to argument array has been scanned. If more entries remain to be scanned the program returns to step 422 and a new entry is identified or if all entries have been scanned the program passes to step 428 at which a check is made to determine if all positions have been processed by loop 425. If more positions remain to be processed the program returns to step 421 and a new position entry is identified, or if all entries have been scanned the program passes to the next code segment.

Figure 27:
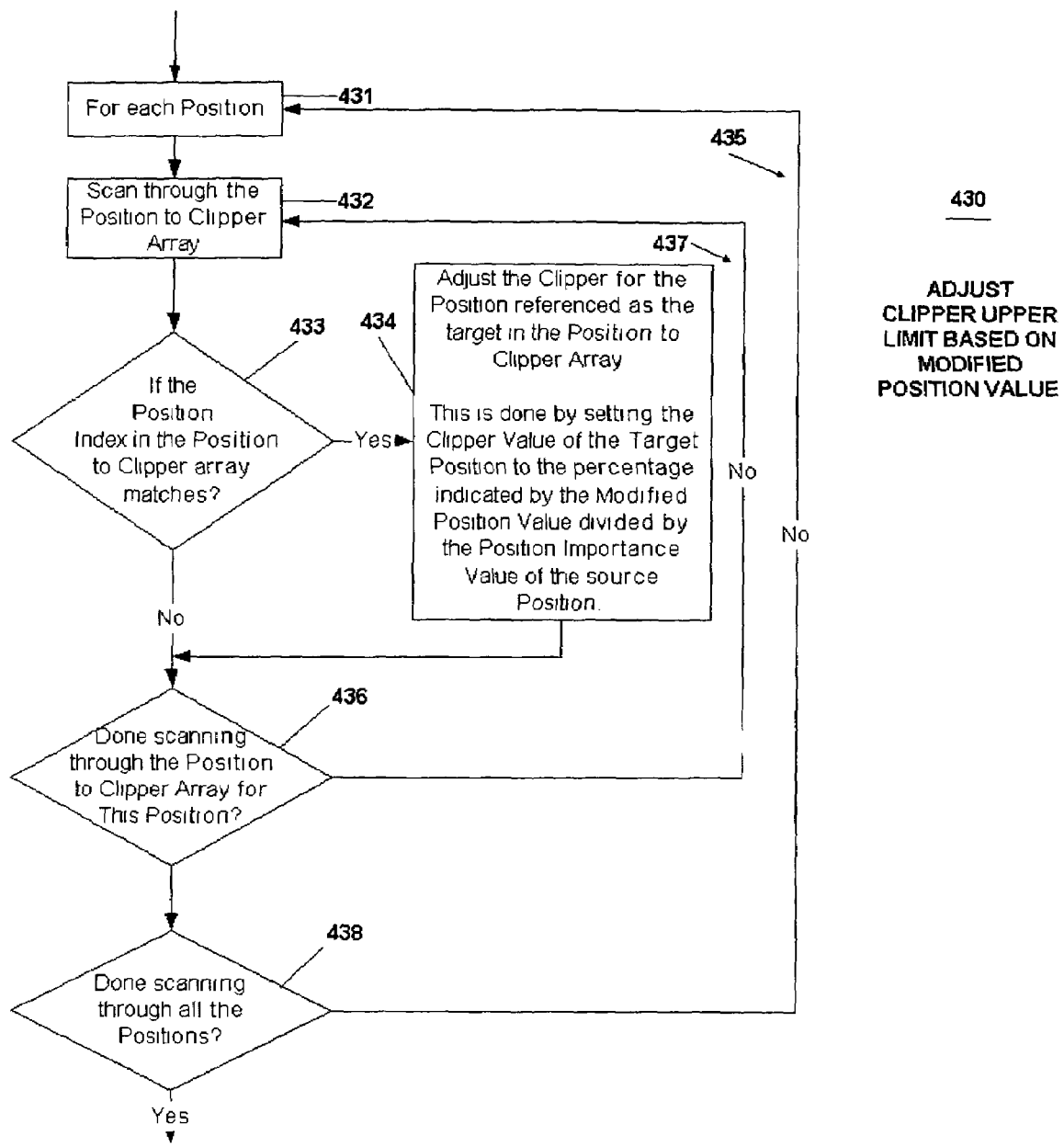
FIG. 27 provides a flowchart for the Adjust Clipper Upper Limit Based On Modified Position Value Code Segment which is entered from the Adjust Argument Values Based On Threshold Code Segment and includes two nested loops for sequentially running through all positions and for each position sequentially running through or scanning the position (modified value) to clipper array and finding the clipper upper limits affected by any changes in the modified position values and resetting those clipper upper limits.

Referring now to FIG. 27, the Adjust Clipper Upper Limit Based On Modified Position Value Code Segment 430 is entered from the Adjust Argument Values Based On Threshold Code Segment 420 at step 431, moves to the next code segment shown in the Make Linkage Adjustments Routine at step 368 from step 438 and includes two nested loops 435 and 437 for sequentially running through all positions and for each position sequentially running through or scanning the position (modified value) to clipper array 283 (FIG. 16) and finding the clipper upper limits affected by any changes in the modified position values and resetting those clipper upper limits. In step 431 the program counts through all the positions as a function of the loop 435. In step 432 the program counts through entries in the position to clipper array and checks for matches between the source position entries in the array 283 and the index of the position currently selected in accordance with the loop 435. When a match is found in decision step 433, the program moves to step 434 and recalculates the value of the clipper upper limit set point as a function of the percentage defined by the source modified value over its position importance (full position value). In the event no match is found in decision step 433 or after the step 434 is completed the program passes to decision step 436 at which a check is made to determine if the entire position to clipper array has been scanned. If more entries remain to be scanned the program returns to step 432 and a new entry is identified or if all entries have been scanned the program passes to step 438 at which a check is made to determine if all positions have been processed by loop 435. If more positions remain to be processed the program returns to step 431 and a new position entry is identified, or if all entries have been scanned the program passes to the next code segment.

Figure 28:
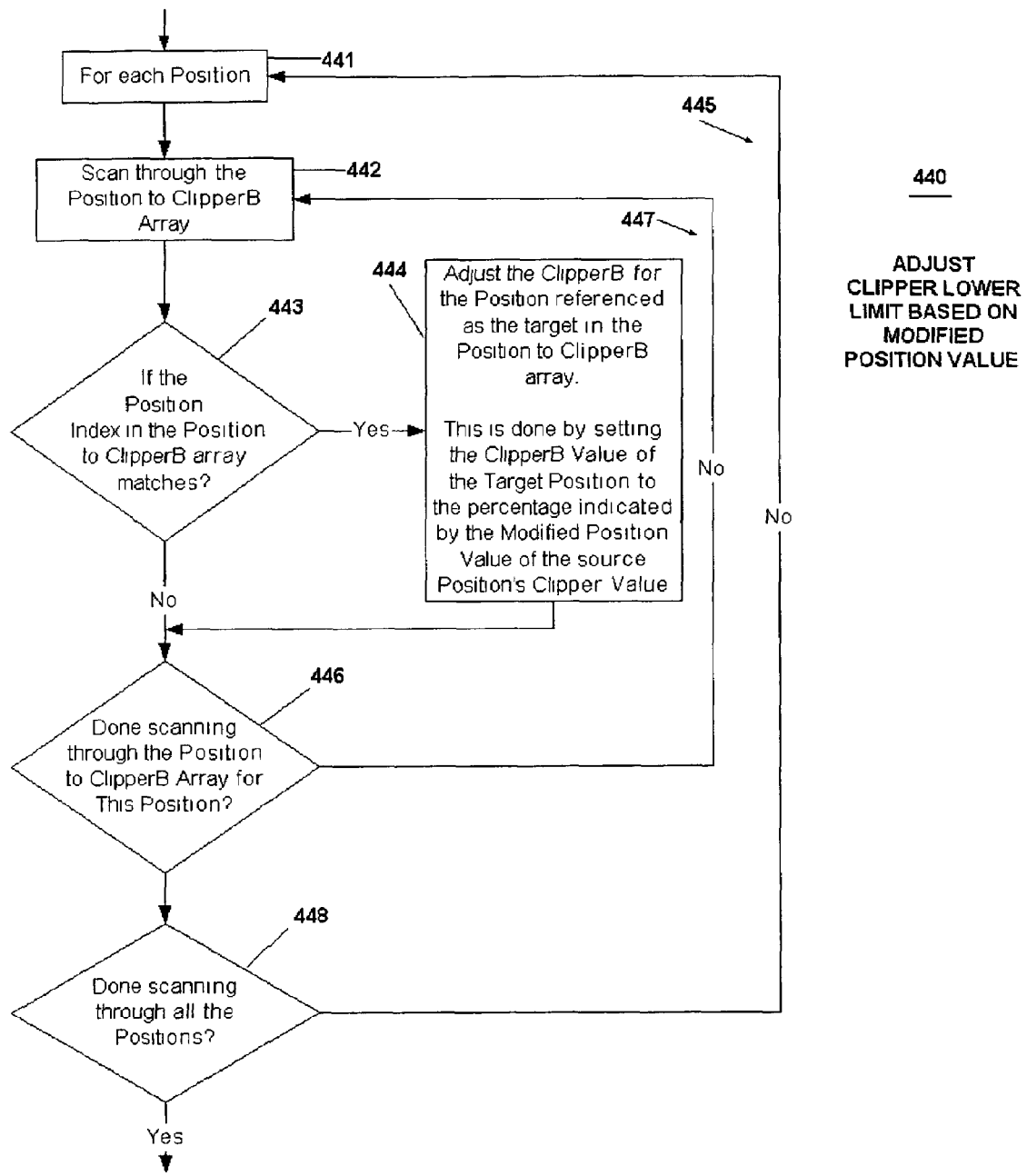
FIG. 28 provides a flowchart for the Adjust Clipper Lower Limit Based On Modified Position Value Code Segment which is entered from the Adjust Clipper Upper Limit Based On Modified Position Value Code Segment and includes two nested loops for sequentially running through all positions and for each position sequentially running through or scanning the (modified) position to clipper B array and finding the clipper lower limits affected by any changes in the modified position values and resetting those clipper lower limits.

Referring now to FIG. 28, the Adjust Clipper Lower Limit Based On Modified Position Value Code Segment 440 is entered from the Adjust Clipper Upper Limit Based On Modified Position Value Code Segment 430 at step 441, moves to the next code segment shown in the Make Linkage Adjustments Routine at step 369 from step 448 and includes two nested loops 445 and 447 for sequentially running through all positions and for each position sequentially running through or scanning the position (modified value) to clipperB array 284 (FIG. 16) and finding the clipper lower limits affected by any changes in the modified position values and resetting those clipper lower limits. In step 441 the program counts through all the positions as a function of the loop 445. In step 442 the program counts through all entries in the position to clipper B array and checks for matches between the source position entries in the array 284 and the index of the position currently selected in accordance with the loop 445. When a match is found in decision step 443, the program moves to step 444 and recalculates the value of the clipper lower limit set point as a function of the percentage defined by the source modified value over its position importance (full position value). In the event no match is found in decision step 443 or after the step 444 is completed the program passes to decision step 446 at which a check is made to determine if the entire position to clipperB array has been scanned. If more entries remain to be scanned the program returns to step 442 and a new entry is identified or if all entries have been scanned the program passes to decision step 448 at which a check is made to determine if all positions have been processed by loop 445. If more positions remain to be processed the program returns to step 441 and a new position entry is identified, or if all entries have been scanned the program passes to the next code segment.

Figure 29:
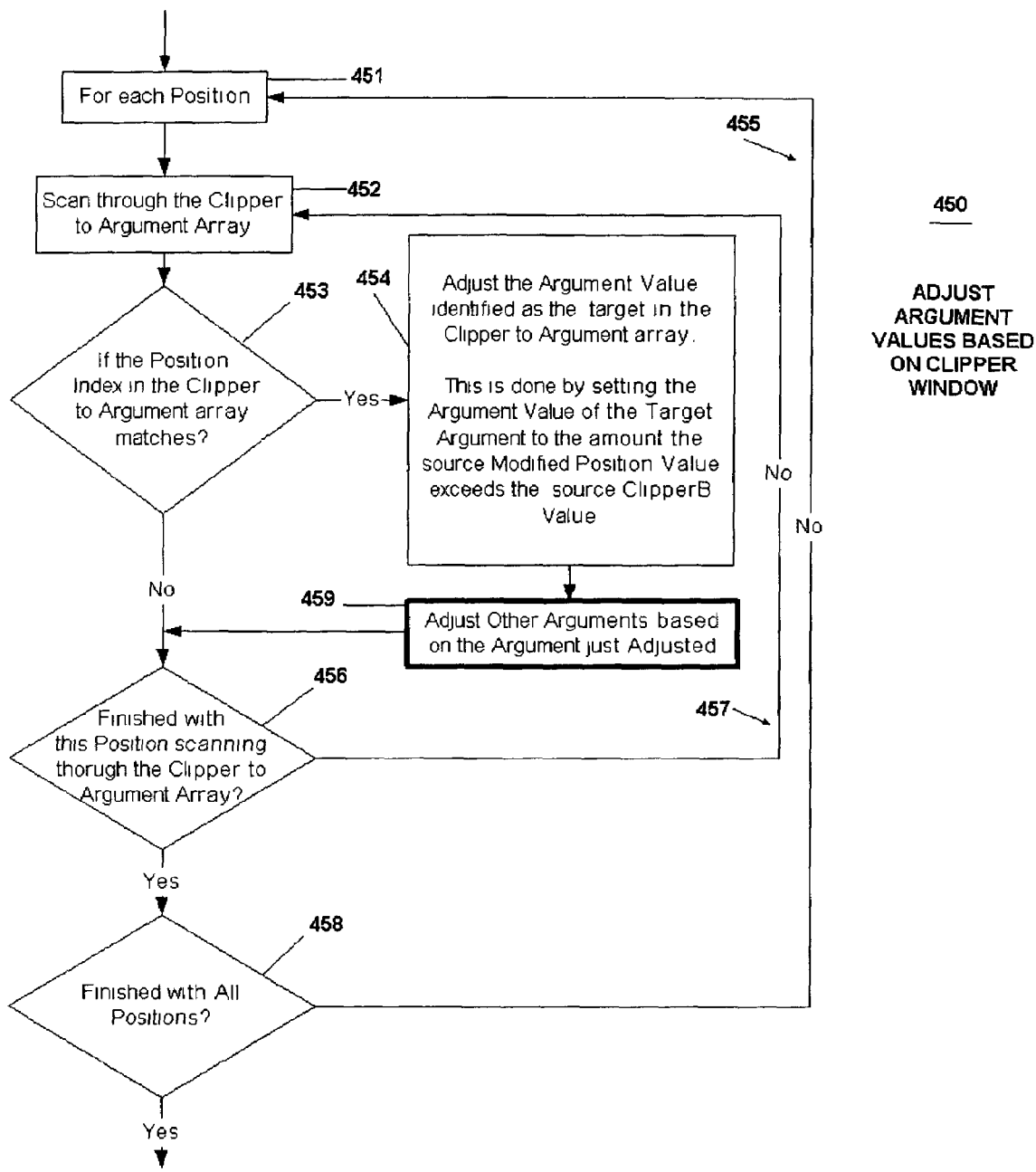
FIG. 29 provides a flowchart for the Adjust Argument Values Based On Clipper Window Code Segment which is entered from the Adjust Clipper Lower Limit Based On Modified Position Value Code Segment and includes two nested loops for sequentially running through all positions and for each position sequentially running through or scanning the clipper to argument array and finding the arguments affected by any changes in the value of the clipper window and resetting those arguments.

Referring now to FIG. 29, the Adjust Argument Values Based On Clipper Window Code Segment 450 is entered from the Adjust Clipper Lower Limit Based On Modified Position Value Code Segment 440 at step 451, moves to the next code segment shown in the Make Linkage Adjustments Routine at step 371 from step 458 and includes two nested loops 455 and 457 for sequentially running through all positions and for each position sequentially running through or scanning the clipper to argument array 286 (FIG. 16) and finding the arguments affected by any changes in the value of the clipper window and resetting those arguments. In step 451 the program counts through all the positions as a function of the loop 455. In step 452 the program counts through all entries in the clipper to argument array and checks for matches between the source clipper entries in the array 286 and the index of the position currently selected in accordance with the loop 455. When a match is found in decision step 453, the program moves to step 454 and recalculates the argument value to equal the amount by which the source position modified value exceeds the clipper lower limit (lower set point). After resetting the argument value in step 454 the program passes to step 459 and runs the Adjusts Other Arguments Routine which will be described later. In the event no match is found in decision step 453 or after the steps 454 and 459 are completed the program passes to decision step 456 at which a check is made to determine if the entire clipper to argument array has been scanned. If more entries remain to be scanned the program returns to step 452 and a new entry is identified or if all entries have been scanned the program passes to decision step 458 at which a check is made to determine if all positions have been processed by loop 455. If more positions remain to be processed the program returns to step 451 and a new position entry is identified, or if all entries have been scanned the program passes to the next code segment.

Figure 30:
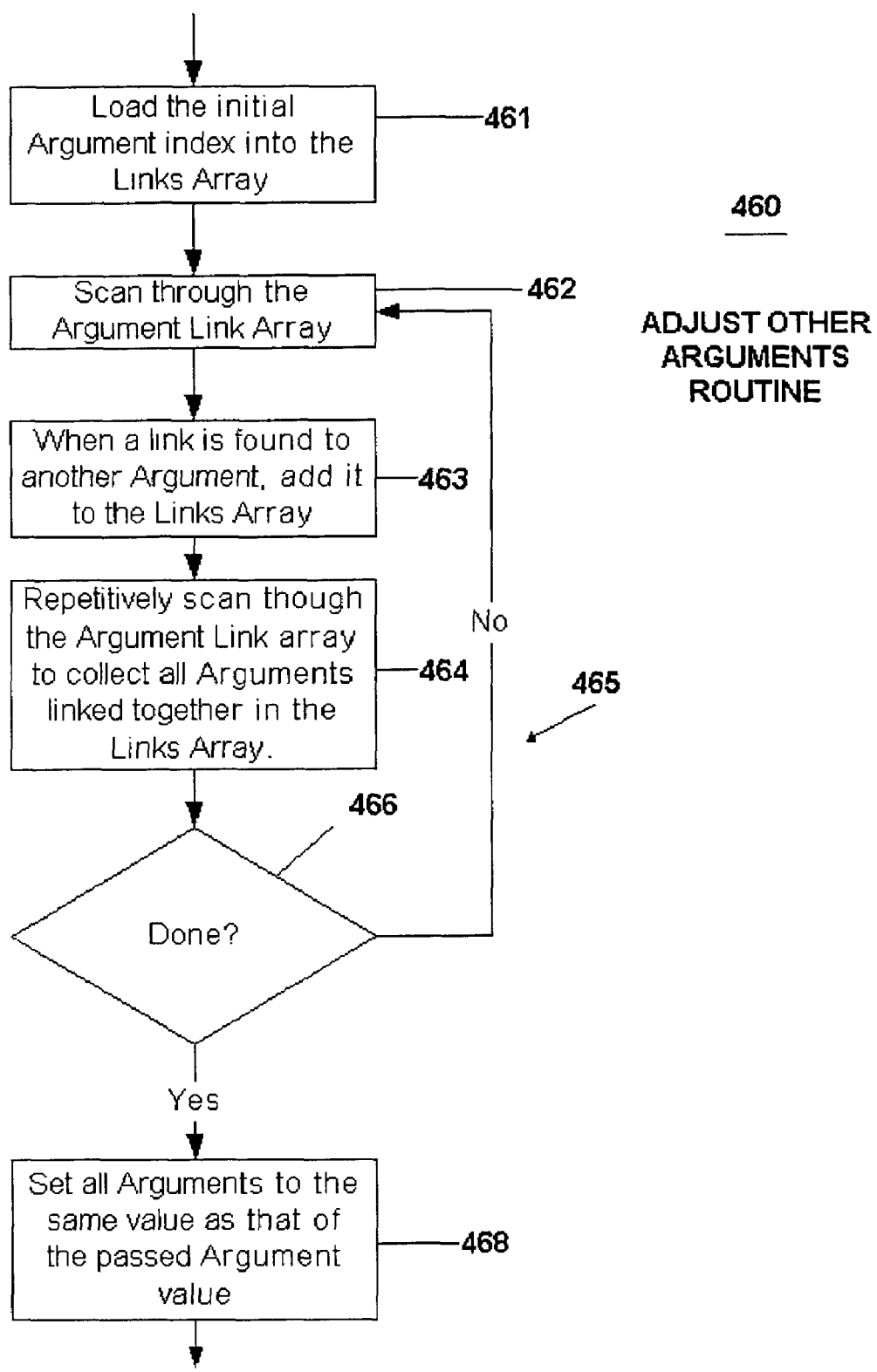
FIG. 30 provides a flowchart for the Adjust Other Arguments Routine that may be entered from other code segments and includes a loop and steps for sequentially running through or scanning the argument to argument array and finding all the arguments affected by changes in an argument value and resetting all those argument values.

Referring now to FIG. 30, the Adjust Other Arguments Routine 460 is entered from the Adjust Argument Values Based On Position Modified Value (FIG. 24), Adjust Argument Values Based On Clipper Window (FIG. 29) and Adjust Argument Values Based On Threshold (FIG. 26) Code Segments at step 461 and includes a loop 465 for sequentially running through or scanning the argument to argument array 287 (FIG. 16) and finding all the arguments affected by changes in a source argument value and adjusting all linked argument values. In step 461 the program sets up a temporary argument Links Array queue and enters the index value of the current affected argument as first entry in this queue. In step 462 the program scans through the argument to argument array in accordance with the loop 465 and checks for matches between the source argument entries in the array 287 and the index of the affected (newly changed) argument. In step 463 arguments are added to the Links Array queue when matches are found. In step 464 the program follows up by scanning the argument to argument array to further identify all arguments linked to arguments newly added to the Links Array queue and likewise adds them to the Links Array queue. After completing step 464 the program enters decision step 466 and checks to see if the argument to argument array 287 has been completely scanned. If the argument to argument array has been fully scanned the program passes to step 468 and otherwise the program returns to step 462 so that the remaining entries can be scanned. In step 468 all the entries in the Links Array queue are set to the same value as the affected argument first entered into the Links Array queue. Thereafter the program returns to the code segment from which it entered the Adjust Other Arguments Routine.

Figure 31:
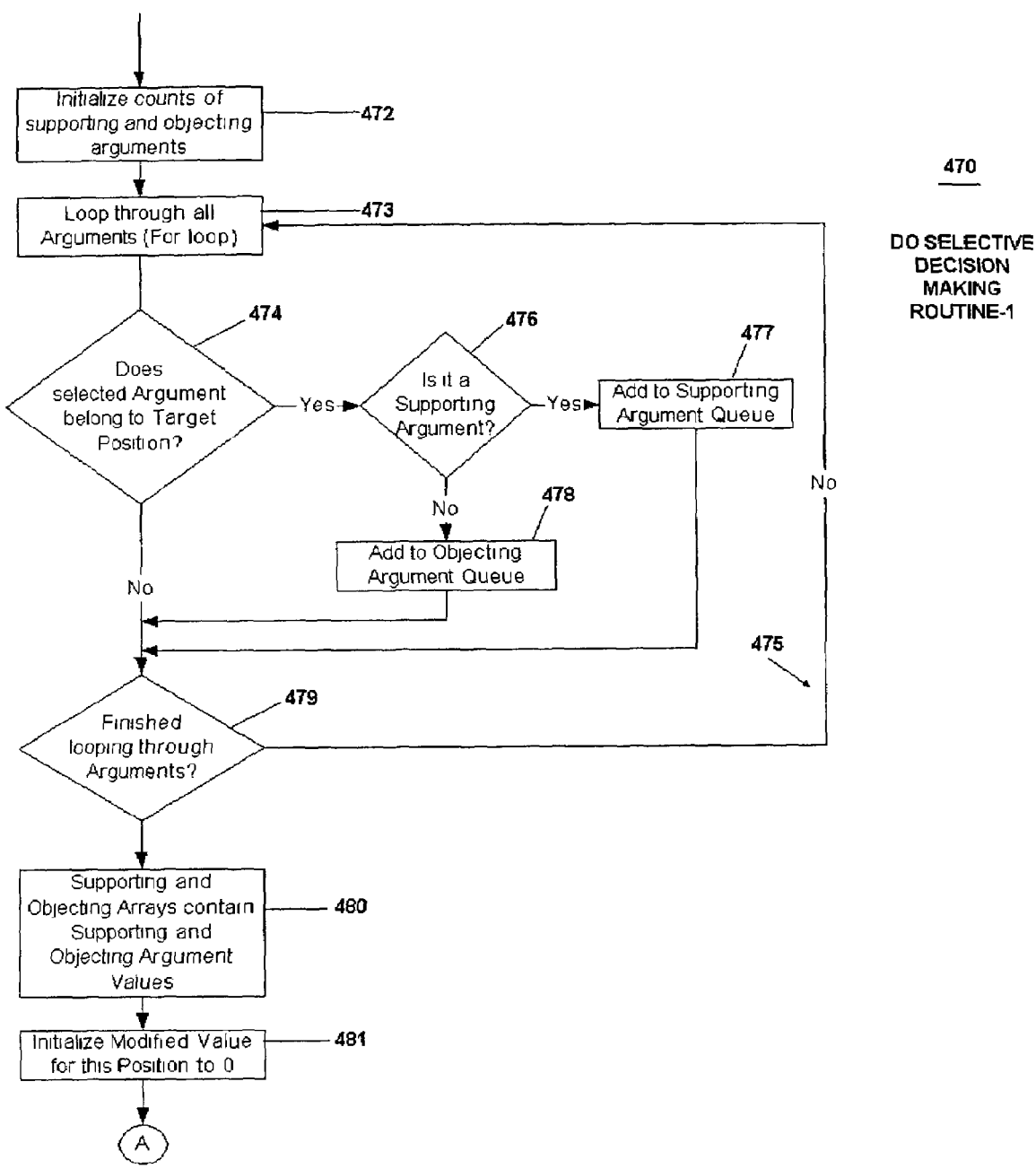
FIGS. 31 and 32 provide a flowchart for the Do Selective Decision Making Routine which may be entered from the Adjust Importance Based on Modified Value and Adjust Importance Based on Clipper Window Code Segments and includes a loop for sorting through all the arguments and identifying the arguments belonging to the selected position and building separate queues of such supporting and objecting arguments, and code for calculating a new modified position value for the selected position by running loops for evaluating the arguments.
Figure 32:
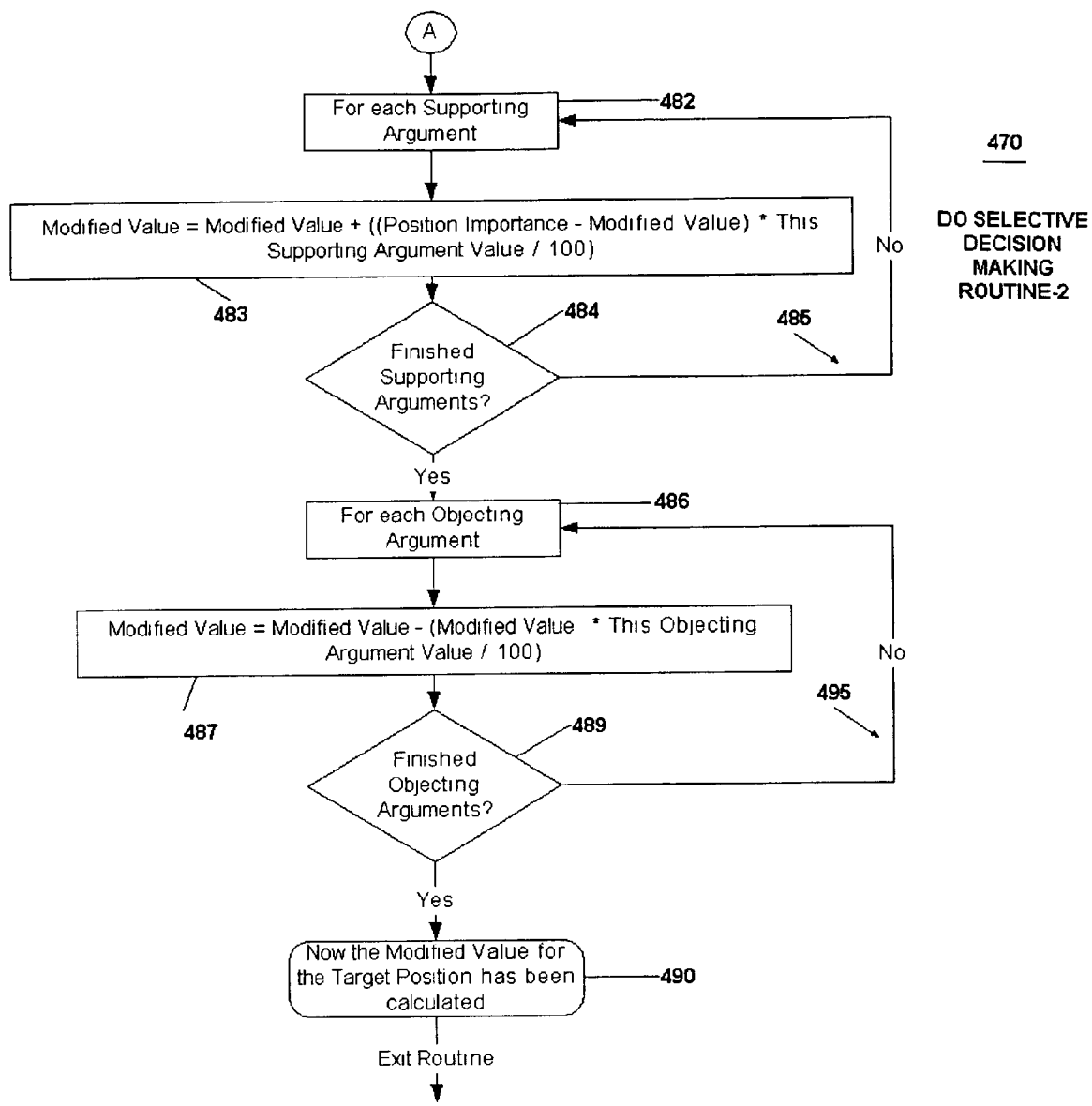

Referring now to FIGS. 31 and 32, the Do Selective Decision Making Routine 470 is entered at step 472 from the Adjust Importance Based on Modified Value (FIG. 22) and Adjust Importance Based on Clipper Window (FIG. 23) code segments and includes a loop 475 for sorting through all the arguments in order to identify the arguments for the "targeted" position affected by the importance change and building a queue of supporting and a queue of objecting arguments which apply to that position, a loop 485 for evaluating the supporting arguments and a loop 495 for evaluating the objecting arguments which are used in calculating a new modified position value for the targeted position. Supporting and objecting argument counts are initialized in step 472 and the loop 475 is entered at step 473. At decision step 474 arguments for the targeted position are identified and when identified control is passed to decision step 476. At decision step 476 the arguments are parsed according to whether they are supporting or objecting arguments. If they are supporting arguments the routine passes to step 477 where a queue of supporting arguments is built. If they are objecting arguments the routine passes to step 478 where a queue of objecting arguments is built. In the event the argument is not identified as belonging to the selected position in step 474 or after processing in steps 477 or 478, the program passes on to decision step 479 associated with loop 475. If the last argument has been processed the routine moves on to step 480. In the event the last argument has not been processed the routine returns to step 473 where the next argument is selected. In step 480 the values of the supporting and objecting arguments in the queues are collected and thereafter the modified position value is initialized to zero in accordance with step 481 in preparation for further processing. In accordance with the loop 485 each supporting argument is sequentially referenced in step 482 and the modified position value is successively recalculated accordance with the formula of step 483. At decision step 484 the routine passes to the objecting argument evaluation loop 495 if all supporting arguments have been processed or otherwise returns to step 482 to select and process another supporting argument. In accordance with the loop 495 each objecting argument is sequentially referenced in step 486 and the modified position value is successively recalculated accordance with the formula of step 487. At decision step 489 the routine passes to step 490 if all supporting arguments have been processed or otherwise returns to step 486 to select and process another objecting argument. In step 490 the program confirms that a final position value output has been calculated and saves this value to memory. A call to the Do Selective Decisions Routine is made after there is an adjustment is to a position importance value and accordingly there is a need to make a recalculation of the modified value of the affected position. The Do Selective Decision Making Routine 470 is optional.

It should be apparent to one of ordinary skill in the art, from the foregoing description, that the present invention provides one or more scaled and interrelated outputs that are related to one or more positions and are based on inputs which come from subservient arguments or challenges, each of which may have been assigned quantitative weights. The inputs are combined as described above according to their tree-structure hierarchy and according to linkages that allow different positions and arguments to interact in a simple and intuitive manner which reflects human decision-making. This basic framework is applicable to a wide range of real world applications.

This framework of providing a web or network of interrelated outputs based on inputs can be used for direct control in a number of application areas such as: aircraft and rail systems, automotive systems, financial systems like insurance underwriting, bank loan administration and brokerage systems, industrial and home automation systems, military and homeland security systems, medical diagnostic and treatment systems and the like where the output values are translated into proportional electrical signals and the inputs are obtained from electrical signals from sensors or other input devices and may or may not be entered by a human operator. The small footprint of the control systems created with this invention makes it effective in small embedded applications. In these types of applications, the present invention provides an intuitive programming mechanism where the programming is in terms if weighted importance of information and linkages between one position or action and another that compete in a hierarchical interaction. In these applications systems may configured to be responsible for evaluating changes in inputs so they can automatically react to changes in environmental factors, changes in its available resources or manual inputs from operators.

This framework of providing a web or network of interrelated outputs based on inputs can also be used for analysis of data and the like where the output values are translated into diagnostic recommendations. This diagnostic information can be used identify faulty or degrading segments of a complete system or to cause systems to adapt and reconfigure themselves without direct human intervention. By packaging the expertise of the best maintenance personnel or the best operators in the current invention by defining inputs as arguments and outputs as positions and linking the system features through linkages, the most effective functionality can be integrated into these systems.

This framework of providing a web or network of interrelated outputs based on inputs can also be used for information synthesis in a number of application areas such as computer based gaming, economic simulations, and strategic planning and the like where output values are translated into proportional values and the inputs are obtained from real or synthetic databases or other input mechanisms as well as human operators. The ability to model different environments with an intuitive programming mechanism where the programming is in terms of importance of information and linkages between one position or action and another, allows users to create interactive models without legacy programming techniques that require specific implantation skills or traditional scripting models.

It is specifically intended that the present invention not be limited to the embodiments and illustrations contained herein. Modified forms of the embodiments shown and described including portions of the embodiments and including combinations of elements from different embodiments are intended to come within the scope of the following claims.

I claim:

1. A graphical programming tool comprising:
   a) a programming interface for use in defining decision making logic including:
      i) a plurality of graphically displayed position assemblies each showing graphically depicted position values and graphically depicted importance of the position value wherein the position value and importance of the position value are independently controllable and the graphical depiction of the importance of the position value visually indicates a relative significance of the graphical depiction of the position value;
      ii) a plurality of graphically displayed arguments showing argument values each of which relates to and is adapted to supply an argument value for use in evaluating one of said positions values,
      iii) one or more graphically displayed linkages between said positions and arguments for specifying functional relationships between said position values, argument values, and importance, wherein at least one graphically displayed linkage provides the position importance modified by the position value to comport with the visually indicated relative significance; and
   b) a program generator for generating an execution engine including program code reflecting the computational logic defined through the use of said programming interface.

2. The graphical programming tool of claim 1 wherein position value is indicated as a resizable graphical element and importance is indicated as a boundary of a range of resizing of the resizable graphical element.

3. The graphical programming tool of claim 1 wherein the importance scales a functional relationship providing the position value.

4. The graphical programming tool of claim 1 wherein at least one graphically displayed linkage controls an importance of one position assembly as a function of a position value of another position assembly.

5. The graphical programming tool of claim 1 wherein at least one graphically displayed position assembly further displays a position threshold and at least one graphically displayed linkage specifies a functional relationship between at least one of a position value, argument values, and position importance and a position threshold.

6. The graphical programming tool of claim 5 wherein position value is indicated as a resizable graphical element and the position threshold is an indicator positionable along a path of the resizable graphical element.

7. The graphical programming tool of claim 5 wherein the position threshold provides a zero output or full output depending on a relative magnitude of the position value with respect to the position threshold.

8. The graphical programming tool of claim 1 wherein at least one graphically displayed position assembly further displays a position clipper providing an upper and lower clipper value and at least one graphically displayed linkage specifies a functional relationships between at least one of a position value, argument values, and importance of the position value and the upper and lower clipper values.

9. The graphical programming tool of claim 8 wherein position value is indicated with a resizable graphical element and the upper and lower clipper values are indicators positionable along a path of the resizable graphical element.

10. The graphical programming tool of claim 8 wherein the position clipper provides a clipper value in accordance with a level of a position value in relation to the upper and lower clipper values.

11. The graphical programming tool of claim 1 wherein the graphically displayed linkages include a linkage providing a functional relationship in which a position value controls multiple argument values for one or more position assemblies.

* * * * *